(12) United States Patent
Gao et al.

(10) Patent No.: US 10,051,290 B2
(45) Date of Patent: Aug. 14, 2018

(54) MULTI-THREADED IMPLEMENTATIONS OF DEBLOCK FILTERING

(71) Applicant: Microsoft Technology Licensing, LLC, Redmond, WA (US)

(72) Inventors: Wenfeng Gao, Bellevue, WA (US); Yongjun Wu, Bellevue, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 14/700,503

(22) Filed: Apr. 30, 2015

(65) Prior Publication Data

US 2015/0237381 A1    Aug. 20, 2015

Related U.S. Application Data

(63) Continuation of application No. 13/078,852, filed on Apr. 1, 2011, now Pat. No. 9,042,458.

(51) Int. Cl.
*H04N 19/86* (2014.01)
*H04N 19/82* (2014.01)
(Continued)

(52) U.S. Cl.
CPC ......... *H04N 19/865* (2014.11); *H04N 19/117* (2014.11); *H04N 19/157* (2014.11);
(Continued)

(58) Field of Classification Search
CPC .. H04N 19/117; H04N 19/157; H04N 19/159; H04N 19/172; H04N 19/436; H04N 19/82; H04N 19/865
(Continued)

(56) References Cited

U.S. PATENT DOCUMENTS 5,089,889 A    2/1992   Sugiyama
5,220,616 A    6/1993   Downing et al.
(Continued)

FOREIGN PATENT DOCUMENTS

EP    0 966 841    12/1999
EP    1246131      10/2002
(Continued)

OTHER PUBLICATIONS

U.S. Appl. No. 60/341,674, filed Dec. 17, 2001, Lee et al.
(Continued)

*Primary Examiner* — Francis G Geroleo
(74) *Attorney, Agent, or Firm* — Klarquist Sparkman, LLP

(57) ABSTRACT

Multi-threaded implementations of deblock filtering improve encoding and/or decoding efficiency. For example, a video encoder or decoder partitions a video picture into multiple segments. The encoder/decoder selects between multiple different patterns for splitting operations of deblock filtering into multiple passes. The encoder/decoder organizes the deblock filtering as multiple tasks, where a given task includes the operations of one of the passes for one of the segments. The encoder/decoder then performs the tasks with multiple threads. The performance of the tasks is constrained by task dependencies which, in general, are based at least in part on which lines of the picture are in the respective segments and which deblock filtering operations are in the respective passes. The task dependencies can include a cross-pass, cross-segment dependency between a given pass of a given segment and an adjacent pass of an adjacent segment.

20 Claims, 7 Drawing Sheets

(51) Int. Cl.
*H04N 19/159* (2014.01)
*H04N 19/172* (2014.01)
*H04N 19/436* (2014.01)
*H04N 19/157* (2014.01)
*H04N 19/117* (2014.01)

(52) U.S. Cl.
CPC ......... *H04N 19/159* (2014.11); *H04N 19/172* (2014.11); *H04N 19/436* (2014.11); *H04N 19/82* (2014.11)

(58) Field of Classification Search
USPC .................................................. 375/240.24
See application file for complete search history.

(56) References Cited

U.S. PATENT DOCUMENTS

| | | | |
|---|---|---|---|
| 5,367,385 A | 11/1994 | Yuan | |
| 5,473,384 A | 12/1995 | Jayant et al. | |
| 5,590,064 A | 12/1996 | Astle | |
| 5,719,958 A | 2/1998 | Wober et al. | |
| 5,737,019 A | 4/1998 | Kim | |
| 5,737,455 A | 4/1998 | Harrington et al. | |
| 5,757,969 A | 5/1998 | Kim | |
| 5,757,982 A | 5/1998 | Tepmongkol | |
| 5,771,318 A | 6/1998 | Fang et al. | |
| 5,787,203 A | 7/1998 | Lee et al. | |
| 5,796,875 A | 8/1998 | Read | |
| 5,799,113 A | 8/1998 | Lee | |
| 5,835,618 A | 11/1998 | Fang et al. | |
| 5,844,613 A | 12/1998 | Chaddha | |
| 5,874,995 A | 2/1999 | Naimpally et al. | |
| 5,970,173 A | 10/1999 | Lee et al. | |
| 5,974,197 A | 10/1999 | Lee et al. | |
| 5,982,459 A | 11/1999 | Fandrianto et al. | |
| 6,016,365 A | 1/2000 | Shin et al. | |
| 6,028,967 A | 2/2000 | Kim et al. | |
| 6,038,256 A | 3/2000 | Wells et al. | |
| 6,160,503 A | 12/2000 | Andrews et al. | |
| 6,167,164 A | 12/2000 | Lee | |
| 6,178,205 B1 | 1/2001 | Cheung et al. | |
| 6,188,799 B1 | 2/2001 | Tan et al. | |
| 6,215,425 B1 | 4/2001 | Andrews et al. | |
| 6,233,017 B1 | 5/2001 | Chaddha | |
| 6,236,764 B1 | 5/2001 | Zhou et al. | |
| 6,240,135 B1 | 5/2001 | Kim | |
| 6,249,610 B1 | 6/2001 | Matsumoto et al. | |
| 6,281,942 B1 | 8/2001 | Wang | |
| 6,285,801 B1 | 9/2001 | Mancuso et al. | |
| 6,320,905 B1 | 11/2001 | Konstantinides | |
| 6,337,881 B1 | 1/2002 | Chaddha | |
| 6,380,985 B1 | 4/2002 | Callahan | |
| 6,466,624 B1 | 10/2002 | Fogg | |
| 6,473,409 B1 | 10/2002 | Malvar | |
| 6,504,873 B1 | 1/2003 | Vehvilainen | |
| 6,529,638 B1 | 3/2003 | Westerman | |
| 6,597,860 B2 | 7/2003 | Song et al. | |
| 6,600,839 B2 | 7/2003 | Mancuso et al. | |
| 6,665,346 B1 | 12/2003 | Lee et al. | |
| 6,690,838 B2 | 2/2004 | Zhou | |
| 6,704,718 B2 | 3/2004 | Burges et al. | |
| 6,724,944 B1 | 4/2004 | Kalevo et al. | |
| 6,741,752 B1 | 5/2004 | Yang | |
| 6,748,113 B1 | 6/2004 | Kondo et al. | |
| 6,766,063 B2 | 7/2004 | Gonsalves | |
| 6,768,774 B1 | 7/2004 | MacInnis et al. | |
| 6,931,063 B2 | 8/2005 | Sun et al. | |
| 6,983,079 B2 | 1/2006 | Kim | |
| 7,003,035 B2 | 2/2006 | Tourapis et al. | |
| 7,120,197 B2 | 10/2006 | Lin et al. | |
| 7,203,234 B1 | 4/2007 | Zeng | |
| 7,426,315 B2 | 9/2008 | Frishman et al. | |
| 7,430,336 B2 | 9/2008 | Raveendran | |
| 7,616,829 B1 | 11/2009 | Bilbrey et al. | |
| 8,213,518 B1 * | 7/2012 | Wang .................... | H04N 19/44 348/721 |
| 8,223,845 B1 | 7/2012 | Duvivier | |
| 8,537,903 B2 | 9/2013 | Lim | |
| 2001/0017944 A1 | 8/2001 | Kalevo et al. | |
| 2002/0009146 A1 | 1/2002 | Westermann et al. | |
| 2002/0067369 A1 | 6/2002 | Sullivan | |
| 2002/0110284 A1 | 8/2002 | Chu et al. | |
| 2002/0136303 A1 | 9/2002 | Sun et al. | |
| 2002/0146072 A1 | 10/2002 | Sun et al. | |
| 2002/0150166 A1 | 10/2002 | Johnson | |
| 2002/0186890 A1 | 12/2002 | Lee et al. | |
| 2003/0021489 A1 | 1/2003 | Miura et al. | |
| 2003/0044080 A1 | 3/2003 | Frishman et al. | |
| 2003/0053541 A1 | 3/2003 | Sun et al. | |
| 2003/0053708 A1 | 3/2003 | Kryukov et al. | |
| 2003/0053711 A1 | 3/2003 | Kim | |
| 2003/0058944 A1 | 3/2003 | MacInnis et al. | |
| 2003/0103680 A1 | 6/2003 | Westermann | |
| 2003/0138154 A1 | 7/2003 | Suino | |
| 2003/0152146 A1 | 8/2003 | Lin et al. | |
| 2003/0202608 A1 | 10/2003 | MacInnis et al. | |
| 2003/0219074 A1 | 11/2003 | Park et al. | |
| 2003/0235248 A1 | 12/2003 | Kim et al. | |
| 2003/0235250 A1 | 12/2003 | Varma et al. | |
| 2004/0057517 A1 | 3/2004 | Wells | |
| 2004/0062310 A1 | 4/2004 | Xue et al. | |
| 2004/0076338 A1 | 4/2004 | Kriss | |
| 2004/0101059 A1 | 5/2004 | Joch et al. | |
| 2004/0120597 A1 | 6/2004 | Le Dinh | |
| 2004/0141557 A1 | 7/2004 | Lin et al. | |
| 2004/0146210 A1 | 7/2004 | Kalevo et al. | |
| 2004/0190626 A1 | 9/2004 | Sun et al. | |
| 2004/0208392 A1 | 10/2004 | Raveendran et al. | |
| 2005/0008251 A1 | 1/2005 | Chiang | |
| 2005/0013494 A1 | 1/2005 | Srinivasan et al. | |
| 2005/0084012 A1 | 4/2005 | Hsu et al. | |
| 2005/0105889 A1 | 5/2005 | Conklin | |
| 2005/0117651 A1 | 6/2005 | Wang et al. | |
| 2005/0175103 A1 | 8/2005 | Sun et al. | |
| 2005/0196063 A1 | 9/2005 | Guangxi et al. | |
| 2005/0207492 A1 | 9/2005 | Pao | |
| 2005/0237433 A1 | 10/2005 | Van Dijk et al. | |
| 2005/0243911 A1 | 11/2005 | Kwon et al. | |
| 2005/0243912 A1 | 11/2005 | Kwon et al. | |
| 2005/0243913 A1 | 11/2005 | Kwon et al. | |
| 2005/0243914 A1 | 11/2005 | Kwon et al. | |
| 2005/0243915 A1 | 11/2005 | Kwon et al. | |
| 2005/0243916 A1 | 11/2005 | Kwon et al. | |
| 2005/0244063 A1 | 11/2005 | Kwon et al. | |
| 2005/0276505 A1 | 12/2005 | Raveendran | |
| 2006/0050783 A1 | 3/2006 | Le Dinh et al. | |
| 2006/0072668 A1 | 4/2006 | Srinivasan et al. | |
| 2006/0072669 A1 | 4/2006 | Lin et al. | |
| 2006/0078052 A1 | 4/2006 | Dang | |
| 2006/0110062 A1 | 5/2006 | Chiang et al. | |
| 2006/0126962 A1 | 6/2006 | Sun et al. | |
| 2006/0165181 A1 | 7/2006 | Kwan et al. | |
| 2006/0171472 A1 | 8/2006 | Sun et al. | |
| 2006/0181740 A1 | 8/2006 | Kim et al. | |
| 2006/0215754 A1 | 9/2006 | Buxton et al. | |
| 2006/0268988 A1 | 11/2006 | Sun et al. | |
| 2006/0274959 A1 | 12/2006 | Piastowski | |
| 2007/0237241 A1 | 10/2007 | Ha et al. | |
| 2007/0280552 A1 | 12/2007 | Lee et al. | |
| 2007/0291141 A1 | 12/2007 | Thorell | |
| 2007/0291858 A1 | 12/2007 | Hussain et al. | |
| 2008/0019605 A1 | 1/2008 | Yea et al. | |
| 2008/0084932 A1 | 4/2008 | Wang et al. | |
| 2008/0159407 A1 | 7/2008 | Yang et al. | |
| 2008/0187053 A1 | 8/2008 | Zhao et al. | |
| 2008/0266398 A1 | 10/2008 | Ferguson | |
| 2009/0003446 A1 | 1/2009 | Wu et al. | |
| 2009/0148062 A1 | 6/2009 | Gabso et al. | |
| 2009/0327386 A1 | 12/2009 | Schoenblum | |
| 2010/0033633 A1 | 2/2010 | Dane et al. | |
| 2010/0128803 A1 | 5/2010 | Divorra Escoda et al. | |
| 2010/0183068 A1 | 7/2010 | Pandit et al. | |
| 2010/0220931 A1 | 9/2010 | Zhou | |
| 2011/0200100 A1 | 8/2011 | Kim et al. | |

(56) References Cited

U.S. PATENT DOCUMENTS

| | | | |
|---|---|---|---|
| 2011/0200103 | A1 | 8/2011 | Kim et al. |
| 2011/0222597 | A1 | 9/2011 | Xu et al. |
| 2012/0082219 | A1 | 4/2012 | Sun et al. |

FOREIGN PATENT DOCUMENTS

| | | |
|---|---|---|
| EP | 1562384 | 8/2005 |
| EP | 1727373 | 11/2006 |
| GB | 2365647 | 2/2002 |
| TW | 379509 | 1/2000 |
| WO | WO 03/036979 | 5/2003 |
| WO | WO 03/101117 | 12/2003 |

OTHER PUBLICATIONS

U.S. Appl. No. 60/488,710, filed Jul. 18, 2003, Srinivasan et al.

Ati Avivo, "Ati Avivo. Part 0: Introduction and Description of Video Technologies," 8 pp. (downloaded from the World Wide Web on Jun. 28, 2006).

Castagno, et al., "A Spline-based Adaptive Filter for the Removal of Blocking Artifacts in Image Sequences Coded at Very Low Bitrate," *IEEE*, pp. 45-48 (Sep. 1996).

Chen et al., "Adaptive Post-filtering of Transform Coefficients for the Reduction of Blocking Artifacts," *IEEE Transactions on Circuits and Systems for Video Technology*, vol. 11, No. 5, pp. 594-602 (2001).

Cheung et al., "Video Coding on Multi-Core Graphics Processors," *IEEE Signal Processing Magazine—Special Issue on Signal Processing on Platforms with Multiple Cores: Design and Applications*, vol. 27, No. 2, pp. 79-89 (Mar. 2010).

Chien et al., "A High Throughput Deblocking Filter Design Supporting Multiple Video Coding Standards," *ISCAS*, pp. 2377-2380 (2009).

Choy et al., "Reduction of Coding Artifacts in Transform Image Coding by Using Local Statistics of Transform Coefficients," *IEEE International Symposium on Circuits and Systems*, pp. 1089-1092 (1997).

Citro et al., "A Multi-Standard Micro-Programmable Deblocking Filter Architecture and its Application to VC-1 Video Decoder," *IEEE Int'l Soc Conf.*, pp. 225-228 (2008).

Citro et al., "Programmable Deblocking Filter Architecture for a VC-1 Video Decoder," *IEEE Trans. on Circuits and Systems for Video Technology*, vol. 19, pp. 1227-1233 (2009).

Elecard Ltd., "AVC/H.264 Decoder with DXVA Support," 2 pp., (downloaded from the World Wide Web on Aug. 27, 2006).

Fong et al., "Integer Lapped Transforms and Their Applications to Image Coding," *IEEE Trans. Image Processing*, vol. 11, No. 10, pp. 1152-1159 (Oct. 2002).

Huang et al., "A Post Deblocking Filter for H.264 Video," *IEEE Proc. Int'l Conf. on Computer Communications and Networks*, pp. 1137-1142 (Aug. 2007).

ISO/IEC, "ISO/IEC 11172-2: Information Technology—Coding of Moving Pictures and Associated Audio for Storage Media at up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ITU-T, "ITU-T Recommendation H.261: Video Codec for Audio-visual Services at p×64 kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (2006).

Jeong et al., "A Directional Deblocking Filter Based on Intra Prediction for H.264 AVC," *IEICE Electronics Express*, vol. 6, No. 12, pp. 864-869 (Jun. 2009).

Joch et al., "A Performance Analysis of the ITU-T Draft H.26L Video Coding Stgandard," http://pv2002.ece.cmu.edu/papers (Aug. 2002).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Joint Collaborative Team on Video Coding (JCT-VC), "Description of Video Coding Technology Proposal by Microsoft," JCTVC-A118, 15 pp. (Apr. 2010).

Kaup, "Reduction of Ringing Noise in Transform Image Coding Using a Simple Adaptive Filter," *Electronics Letters*, vol. 34, No. 22, 8 pp. (Oct. 1998).

Kong et al., "Edge Map Guided Adaptive Post-Filter for Blocking and Ringing Artifacts Removal," Mitsubishi Electric Research Technical Report TR-2004-003, 6 pp. (Feb. 2004).

Kotropoulos et al., "Adaptive LMS L-filters for Noise Suppression in Images," *IEEE Transactions on Image Processing*, vol. 5, No. 12, pp. 1596-1609 (1996). [48 pp. as downloaded from the World Wide Web on Apr. 30, 2001.].

Lee et al. "Analysis and Efficient Architecture Design for VC-1 Overlap Smoothing and In-Loop Deblocking Filter," *IEEE Trans. on Circuits and Systems for Video Technology*, vol. 18, pp. 1786-1796 (2008).

Lee et al., "Analysis and Integrated Architecture Design for Overlap Smooth and In-Loop Deblocking Filter in VC-1," ICIP, vol. 5, pp. 169-172 (2007).

Lee et al., "Blocking Effect Reduction of JPEG Images by Signal Adaptive Filtering," *IEEE Trans. On Image Processing*, vol. 7, pp. 229-234 (Feb. 1998).

Lee et al., "Loop Filtering and Post-filtering for Low-bit-rates Moving Picture Coding," *Signal Processing: Image Communication 16*, pp. 871-890 (2001).

Linares et al., "JPEG Estimated Spectrum Adaptive Postfiltering Using Image-Adaptive Q-Tables and Canny Edge Detectors," *Proc. ISCAS'96*, Atlanta, GA (May 1996).

List et al., "Adaptive Deblocking Filter," *IEEE Trans. Circuits Syst. Video Technol.*, vol. 13, No. 7, pp. 614-619 (Jul. 2003).

Liu et al., "An In/Post-Loop Deblocking Filter with Hybrid Filtering Schedule," *IEEE Trans. on Circuits and Systems for Video Technology*, vol. 17, pp. 937-943 (2007).

Malvar, "A Pre- and Post-filtering Technique for the Reduction of Blocking Effects," *Proc. Picture Coding Symp.*, Stockholm, Sweden (Jun. 1987).

Malvar, "Biorthogonal and Nonuniform Lapped Transforms for Transform Coding with Reduced Blocking and Ringing Artifacts," *IEEE Transactions on Signal Processing*, vol. 46, No. 4, pp. 1043-1053 (Apr. 1998).

Meier et al., "Reduction of Blocking Artifacts in Image and Video Coding," *IEEE Trans. On Circuits and Systems for Video Technology*, vol. 9, No. 3, pp. 490-500 (Apr. 1999).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Minami et al., "An Optimization Approach for Removing Blocking Effects in Transform Coding," *IEEE Transactions on Circuits and Systems for Video Technology*, vol. 5, No. 2, pp. 74-82 (1995).

Mook, "Next-Gen Windows Media Player Leaks to the Web," *BetaNews*, 17 pp. (Jul. 19, 2002) [Downloaded from the World Wide Web on Aug. 8, 2003].

O'Rourke et al., "Improved Image Decompression for Reduced Transform Coding Artifacts," *IEEE Trans. on Circuits and Systems for Video Technology*, vol. 5, No. 6 (Dec. 1995).

Ostermann et al., "Video Coding with H.264/AVC: Tools, Performance, and Complexity," *IEEE Circuits and Systems Magazine*, pp. 7-28 (2004).

Panis et al., "A Method for Reducing Block Artifacts by Interpolating Block Borders," available at http://www.cs/mcgill.ca/~gstamm/Siemens1/paper1.html.

(56) References Cited

OTHER PUBLICATIONS

Panis et al., "Reduction of Block Artifacts by Selective Removal and Reconstruction of the Block Borders," *Picture Coding Symposium 97*, Berlin (Sep. 10-12, 1997).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Ren et al., "Computationally Efficient Mode Selection in H.264/AVC Video Coding," *IEEE Trans. on Consumer Electronics*, vol. 54, No. 2, pp. 877-886 (May 2008).

Richardson, *H.264 and MPEG-4 Video Compression: Video Coding for Next-generation Multimedia*, pp. 184-187 (2003).

SMPTE, "VC-1 Compressed Video Bitstream Format and Decoding Process," SMPTE 421M-2006, 493 pp. (2006).

Sullivan et al., "Microsoft DirectX VA: Video Acceleration API/DDI," *DirectX® VA Version 1.01*, 88 pp. (Jan. 23, 2001).

Sullivan et al., "The H.264/AVC Advanced Video Coding Standard: Overview and Introduction to the Fidelity Range Extensions," 21 pp. (Aug. 2004).

Sun et al., "Loop Filter with Skip Mode," Study Group 16, Video Coding Experts Group, 8 pp. (2001).

Vargas, "DXVA 2.0: A New Hardware Video Acceleration Pipeline for Windows Vista," WinHEC 2006, 5 pp. (downloaded from the World Wide Web on Jul. 31, 2006).

Wang et al., "A Multi-Core Architecture Based Parallel Framework for H.264/AVC Deblocking Filters," *J. Sign. Process. Syst.*, vol. 57, No. 2, 17 pp. (document marked "published online: Dec. 4, 2008").

Wang, "H.264 Baseline Video Implementation on the CT3400 Multi-core DSP," Cradle Technologies, 15 pp. (2006).

Wang et al., "Interlace Coding Tools for H.26L Video Coding," ITU, VCEG-037, 20 pp. (Nov. 2001).

Wang et al., "Objective Video Quality Video Assessment," Ch. 41 in *The Handbook of Video Databases: Design and Applications*, pp. 1041-1078 (Sep. 2003).

Wiegand, "Joint Model No. 1, Revision 1 (JM1-r1)," JVT-A003r1, 80 pp. (document marked "Generated: Jan. 18, 2002").

Wien, "Variable Block-Size Transforms for Hybrid Video Coding," Dissertion, 182 pp. (Feb. 2004).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Zhang et al., "A New Approach to Reduce the 'Blocking Effect' of Transform Coding," *IEEE Transactions on Communications*, vol. 41, No. 2, pp. 299-302 (1993).

\* cited by examiner

Figure 1, prior art
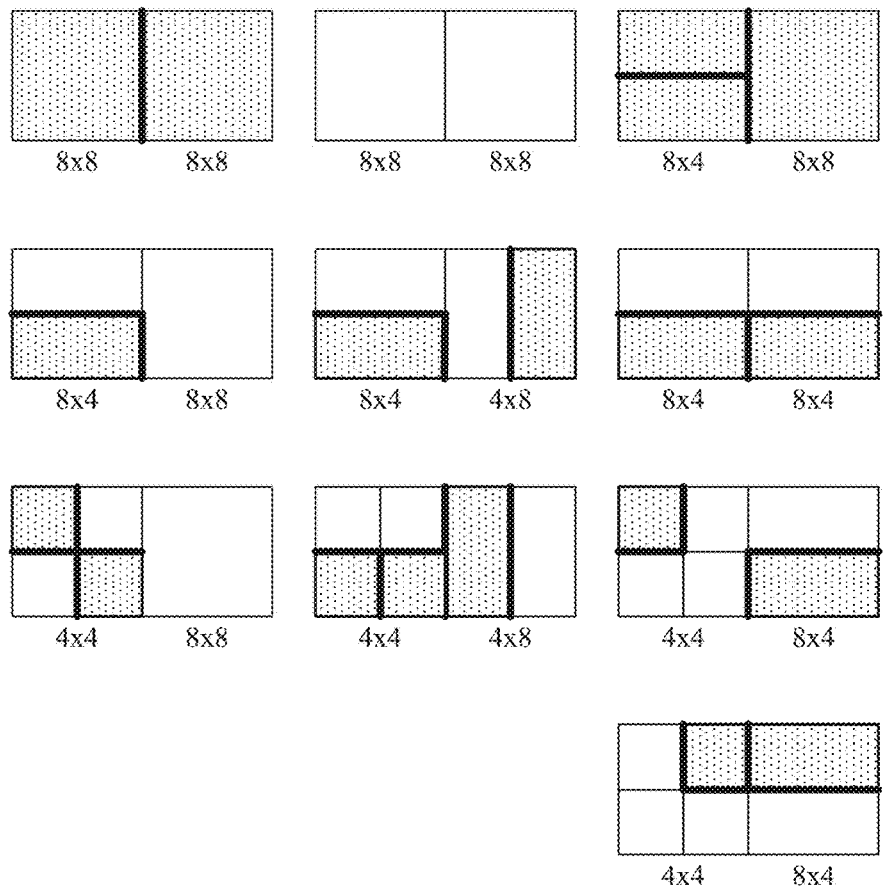
Figure 2
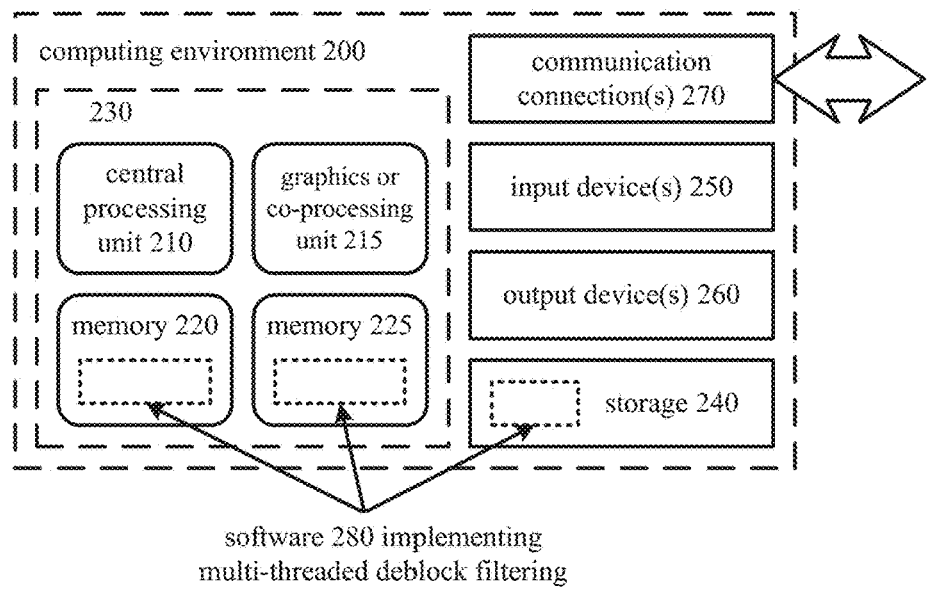

MULTI-THREADED IMPLEMENTATIONS OF DEBLOCK FILTERING

CROSS REFERENCE TO RELATED APPLICATIONS

This application is a continuation of U.S. patent application Ser. No. 13/078,852, filed Apr. 1, 2011, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

Quantization and other lossy processing can result in visible lines at boundaries between blocks or sub-blocks of a picture. Such "blocking artifacts" might occur, for example, if adjacent blocks in a smoothly changing region of a picture (such as a sky area) are quantized to different average levels. Blocking artifacts can be especially troublesome in pictures that are used as reference pictures for motion compensation processes during encoding and decoding. To reduce blocking artifacts, an encoder and decoder can use "deblock" filtering to smooth boundary discontinuities between blocks and/or sub-blocks in reference pictures. The filtering is "in-loop" in that it occurs inside a motion-compensation loop—the encoder and decoder perform it on reference pictures used later in encoding/decoding. Deblock filtering typically improves the quality of motion compensation, resulting in better motion-compensated prediction and lower bitrate for prediction residuals, thereby increasing coding efficiency. For this reason, in-loop deblock filtering is usually enabled during encoding, in which case a decoder also performs in-loop deblock filtering for correct decoding. A decoder may also perform "post-processing" deblock filtering on pictures output by the decoder, outside of the motion-compensation loop.

Various video standards and products incorporate in-loop deblock filtering. The details of the filtering vary depending on the standard or product, and can be quite complex. Even within a standard or product, the rules of applying deblock filtering can vary depending on factors such as content/smoothness, motion vectors for blocks/sub-blocks on different sides of a boundary, block/sub-block size, coded/not coded status (e.g., whether transform coefficient information is signaled in the bitstream), and progressive/interlaced field/interlaced frame mode. For example, FIG. 1 shows some block/sub-block boundaries when an encoder and decoder perform in-loop filtering in a motion-compensated progressive video frame. The encoder and decoder use transforms of varying size (8×8, 8×4, 4×8 or 4×4). A shaded block/sub-block indicates the block/sub-block is coded. Thick lines represent the boundaries that are adaptively filtered, and thin lines represent the boundaries that are not filtered. The boundary between a given block/sub-block and a neighboring block/sub-block may or may not be adaptively filtered. Generally, a boundary between a given block/sub-block and a neighboring block/sub-block is filtered unless both are inter-coded, both have the same motion vector, and both are not coded (lack transform coefficient information in the bitstream).

Video encoding and decoding are very computationally intensive, and in-loop deblock filtering is relatively computationally intensive even compared to other video encoding and decoding operations. This computational intensity can be problematic in various scenarios, such as decoding of high-quality high-bit rate video (e.g., for high-definition video). Some decoders use video acceleration to offload selected computationally intensive operations to a graphics processor. For example, a decoder uses the primary central processing unit as a host to control overall decoding and uses a graphics processor to perform repeated operations that collectively involve extensive computation. In particular, the decoder uses the graphics processor to perform filtering operations on pixel values of multiple lines or multiple blocks in parallel for in-loop deblock filtering. This low-level parallelism can be efficient in certain scenarios. Some computing devices lack a graphics processor, however, or are not configured to use the graphics processor for decoding, or are unable to use the graphics processor for decoding because it is occupied with other operations.

On the other hand, the number of processing cores available to computing systems grows nearly every year. To take advantage of multiple threads available on multi-core machines, some encoders and decoders use multi-threading to improve encoding/decoding performance. For multi-threading, operations are split into tasks that can be performed with different threads. For example, for decoding, different tasks can be used for entropy decoding, inverse frequency transforms and motion compensation, respectively. In some cases, different tasks can be performed in parallel, which improves performance. In other cases, the performance of one task is dependent on the completion of another task.

SUMMARY

In summary, the detailed description presents techniques and tools for multi-threaded deblock filtering. By speeding up encoding/decoding or more effectively using available computing resources, the multi-threaded deblock filtering can improve encoding and/or decoding efficiency, while at the same time producing filtered pixel values that are correct and unchanged compared to single-threaded approaches.

According to one aspect of the techniques and tools described herein, a video encoder or decoder partitions a video picture into multiple segments for deblock filtering whose operations are split into multiple passes. The deblock filtering can include in-loop deblock filtering and/or post-processing deblock filtering. The number of segments can be set to the number of threads to be used for deblock filtering. Segment boundaries can align with block boundaries of blocks of the picture, in which case each of the segments can include one or more rows or columns of the blocks of the picture. The encoder/decoder organizes the deblock filtering as multiple tasks, where a given task includes the operations of one of the passes (of deblock filtering operations) for one of the segments. The encoder/decoder then performs the tasks with multiple threads.

The performance of the tasks is constrained by task dependencies. In general, the task dependencies are based at least in part on which lines of the picture are in the respective segments and which operations of the deblock filtering are in the respective passes. The task dependencies can include a cross-pass, cross-segment dependency between a given pass of a given segment and an adjacent pass of an adjacent segment. For example, the cross-pass, cross-segment dependency is due to use, during the given pass of the given segment, of a loop filter flag or pixel values set in the adjacent pass of the adjacent segment.

According to another aspect of the techniques and tools described herein, a video encoder or decoder determines the picture coding type (e.g., I, P, B or BI) of a video picture. The encoder/decoder partitions the video picture into multiple segments for deblock filtering. Based at least in part on the picture coding type, the encoder/decoder selects between multiple different patterns for splitting operations of the deblock filtering into multiple passes. The selection of the pattern can also be based at least in part on the frame coding mode (e.g., progressive, interlaced field, or interlaced frame) of the picture. The encoder/decoder organizes the deblock filtering for the video picture as multiple tasks, where a given task includes the operations of one of the multiple passes for one of the multiple segments, then performs the multiple tasks with multiple threads.

According to another aspect of the techniques and tools described herein, a video encoder or decoder partitions a video picture into multiple segments for deblock filtering whose operations are split into three or more passes. For example, the passes include a first pass for making filtering decisions, a second pass for filtering of horizontal block boundaries, a third pass for filtering of horizontal sub-block boundaries, and a fourth pass for filtering of vertical boundaries. Or, the passes include a first pass for making filtering decisions, a second pass for filtering of horizontal boundaries for a top field, a third pass for filtering of horizontal boundaries for a bottom field, and a fourth pass for filtering of vertical boundaries for the top field and the bottom field. The encoder/decoder organizes the deblock filtering for the video picture as multiple tasks, then performs the multiple tasks with multiple threads.

The foregoing and other objects, features, and advantages of the invention will become more apparent from the following detailed description, which proceeds with reference to the accompanying figures.

BRIEF DESCRIPTION OF THE DRAWINGS

FIG. 1 is a diagram showing some block/sub-block boundaries between horizontally neighboring blocks/sub-blocks in a video frame according to the prior art.

FIG. 2 is a block diagram illustrating a generalized computing system in which several of the described embodiments may be implemented.

DETAILED DESCRIPTION

Figure 3:
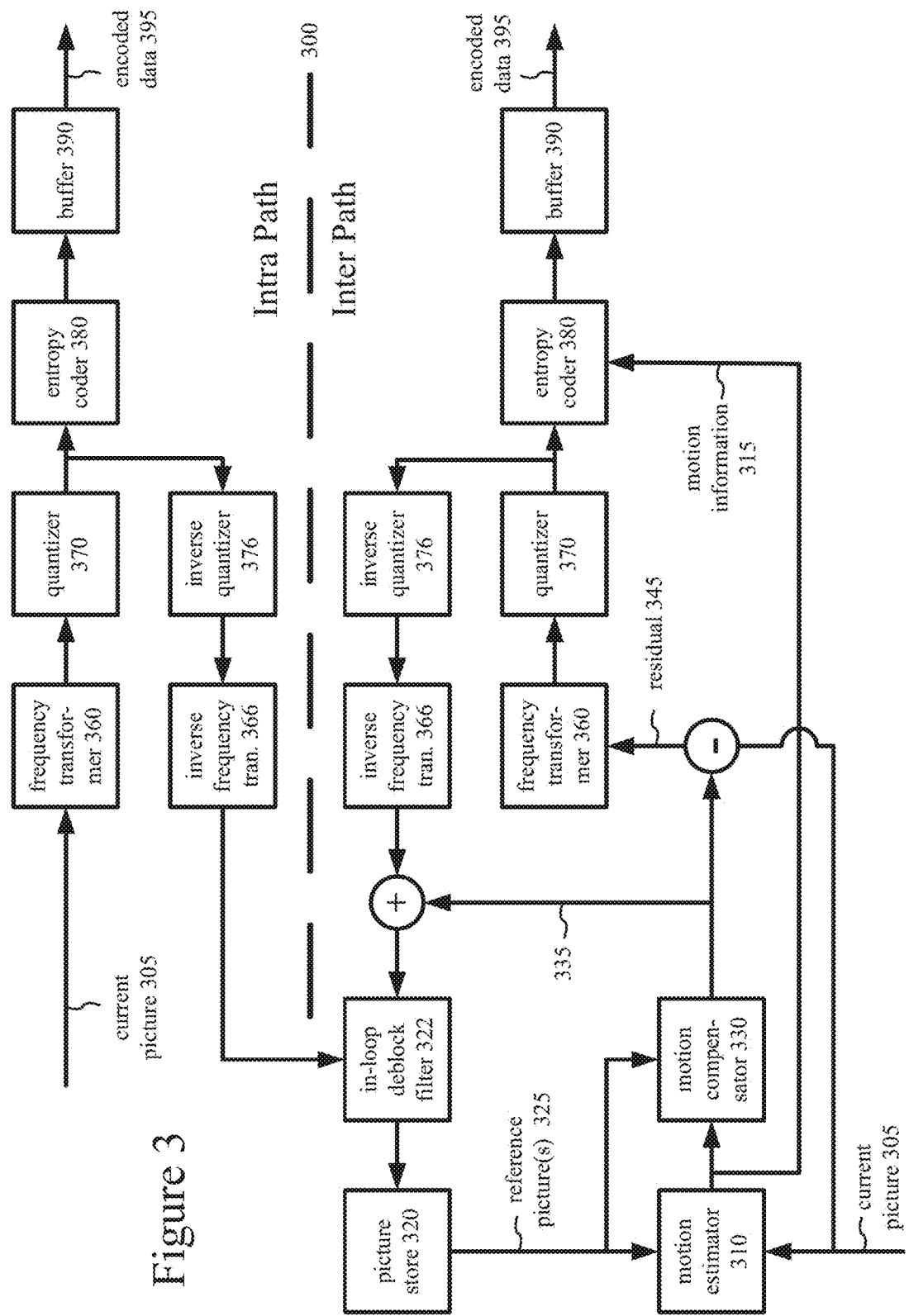
FIG. 3 is a block diagram of a generalized video encoder in conjunction with which several of the described embodiments may be implemented.

The detailed description presents techniques and tools for multi-threaded deblock filtering. Deblock filtering is a computationally intensive part of video encoding and decoding. Innovations described herein provide ways to divide deblock filtering for a picture into multiple independent tasks that can be performed in parallel with different threads, where possible. This can improve decoding efficiency as well as encoding efficiency, while still yielding filtered pixel values that provide a bit-exact match to results of single-threaded deblock filtering.

Some innovations described herein are illustrated with reference to syntax elements and operations specific to the VC-1 standard (SMPTE 421M). Such innovations can also be implemented for other standards or formats. Moreover, some innovations described herein are illustrated with reference to in-loop deblock filtering, but many of the techniques and tools described herein can also be used for post-processing deblock filtering or deblock filtering at another stage of encoding or decoding. More generally, various alternatives to the examples described herein are possible. Certain techniques described with reference to flowchart diagrams can be altered by changing the ordering of stages shown in the flowcharts, by splitting, repeating or omitting certain stages, etc. The various aspects of the innovations described herein can be used in combination or separately. Different embodiments use one or more of the described techniques and tools. Some of the techniques and tools described herein address one or more of the problems noted in the background. Typically, a given technique/tool does not solve all such problems.

I. Example Computing Systems.

FIG. 2 illustrates a generalized example of a suitable computing system (200) in which several of the described techniques and tools may be implemented. The computing system (200) is not intended to suggest any limitation as to scope of use or functionality, as the techniques and tools may be implemented in diverse general-purpose or special-purpose computing environments.

With reference to FIG. 2, the computing system (200) includes one or more processing units (210, 215) and memory (220, 225). In FIG. 2, this most basic configuration (230) is included within a dashed line. The processing units (210, 215) execute computer-executable instructions. A processing unit can be a general-purpose CPU, processor in an application-specific integrated circuit (ASIC) or any other type of processor. In a multi-processing system, multiple processing units execute computer-executable instructions to increase processing power. For example, FIG. 2 shows a CPU (110) as well as a graphics processing unit or co-processing unit (215). The memory (220, 225) may be volatile memory (e.g., registers, cache, RAM), non-volatile memory (e.g., ROM, EEPROM, flash memory, etc.), or some combination of the two, accessible by the processing unit(s). The memory (220, 225) stores software (280) implementing multi-threaded deblock filtering, in the form of computer-executable instructions suitable for execution by the processing unit(s).

A computing system may have additional features. For example, the computing system (200) includes storage (240), one or more input devices (250), one or more output devices (260), and one or more communication connections (270). An interconnection mechanism (not shown) such as a bus, controller, or network interconnects the components of the computing system (200). Typically, operating system software (not shown) provides an operating environment for other software executing in the computing system (200), and coordinates activities of the components of the computing system (200).

The tangible storage (240) may be removable or non-removable, and includes magnetic disks, magnetic tapes or cassettes, CD-ROMs, DVDs, or any other medium which can be used to store information in a non-transitory way and which can be accessed within the computing system (200). In FIG. 2, the storage (240) stores instructions for the software (280) implementing multi-threaded deblock filtering.

The input device(s) (250) may be a touch input device such as a keyboard, mouse, pen, or trackball, a voice input device, a scanning device, or another device that provides input to the computing system (200). For image or video encoding, the input device(s) (250) may be a video card, TV tuner card, camera or similar device that accepts video input in analog or digital form, or a CD-ROM or CD-RW that reads samples into the computing system (200). The output device(s) (260) may be a display, printer, speaker, CD-writer, or another device that provides output from the computing system (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless media implemented with an electrical, optical, RF, or other carrier.

The techniques and tools can be described in the general context of computer-readable media. Computer-readable media are any available tangible media that can be accessed within a computing system. By way of example, and not limitation, with the computing system (200), computer-readable media include memory (220), storage (240), and combinations of any of the above.

The techniques and tools can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing system. These terms are high-level abstractions for operations performed by a computer, and should not be confused with acts performed by a human being. The actual computer operations corresponding to these terms vary depending on implementation.

II. Example Encoders.

FIG. 3 is a block diagram of a generalized video encoder (300) in conjunction with which some described embodiments may be implemented. The encoder (300) receives a sequence of video pictures including a current picture (305) and produces encoded data (395) as output to storage, a buffer, or a communications connection.

The encoder (300) processes video pictures. The term picture generally refers to source, coded or reconstructed image data. For progressive video, lines of a video frame contain samples starting from one time instant and continuing through successive lines to the bottom of the frame. An interlaced video frame consists of two scans—one for the even lines of the frame (the top field) and the other for the odd lines of the frame (the bottom field). The two fields may represent two different time periods or they may be from the same time period. When the two fields of a frame represent different time periods, this can create jagged tooth-like features in regions of the frame where motion is present. Therefore, interlaced video frames can be rearranged according to a field structure, with the odd lines grouped together in one field, and the even lines grouped together in another field. This arrangement, known as field coding, is useful in high-motion pictures. On the other hand, in stationary regions, image detail in the interlaced video frame may be more efficiently preserved without rearrangement into separate fields. Accordingly, frame coding is often used in stationary or low-motion interlaced video frames (but in some cases individual macroblocks can still be field-coded). For progressive video, a "picture" is a progressive video frame. For interlaced video, the term picture may refer to an interlaced video frame, top field of the frame, or bottom field of the frame, depending on context.

The encoder (300) is block-based and uses a macroblock format that depends on implementation. Blocks may be further sub-divided at different stages, e.g., at the frequency transform and entropy encoding stages. For example, a picture can be divided into 16×16 macroblocks, which can in turn be divided into 8×8 blocks and smaller sub-blocks of pixel values for coding and decoding.

The encoder system (300) compresses predicted pictures and intra-coded pictures. For the sake of presentation, FIG. 3 shows an "intra path" through the encoder (300) for intra-picture coding and an "inter path" for inter-picture coding. Many of the components of the encoder (300) are used for compressing both intra-picture coding and inter-picture coding. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures. In some cases, a predicted picture can include intra-coded macroblocks or blocks. According to the VC-1 standard, a "BI" picture is a special B picture that has intra-coded blocks and is encoded/decoded much like an I picture.

If the current picture (305) is a predicted picture, a motion estimator (310) estimates motion of macroblocks, blocks, sub-blocks or other sets of pixel values of the current picture (305) with respect to one or more reference pictures. The picture store (320) buffers one or more reconstructed previous pictures (325) for use as reference pictures. When multiple reference pictures are used, the multiple reference pictures can be from different temporal directions or the same temporal direction. The motion estimator (310) outputs as side information motion information (315) such as differential motion vector information.

The motion compensator (330) applies reconstructed motion vectors to the reconstructed reference picture(s) (325) when forming a motion-compensated current picture (335). The difference (if any) between a sub-block, block, macroblock, etc. of the motion-compensated current picture (335) and corresponding part of the original current picture (305) is the prediction residual (345) for the sub-block, block, macroblock, etc. During later reconstruction of the current picture, reconstructed prediction residuals are added to the motion-compensated current picture (335) to obtain a reconstructed picture that is closer to the original current picture (305). In lossy compression, however, some information is still lost from the original current picture (305). The intra path can include an intra prediction module (not shown) that spatially predicts pixel values of a current block or sub-block from neighboring, previously reconstructed pixel values.

A frequency transformer (360) converts spatial domain video information into frequency domain (i.e., spectral, transform) data. For block-based video pictures, the frequency transformer (360) applies a discrete cosine transform, an integer approximation thereof, or another type of forward block transform to blocks or sub-blocks of pixel value data or prediction residual data, producing blocks/sub-blocks of frequency transform coefficients. A quantizer (370) then quantizes the transform coefficients. For example, the quantizer (370) applies non-uniform, scalar quantization to the frequency domain data with a step size that varies on a picture-by-picture basis, macroblock-by-macroblock basis or other basis.

When a reconstructed version of the current picture is needed for subsequent motion estimation/compensation, an inverse quantizer (376) performs inverse quantization on the quantized frequency coefficient data. An inverse frequency transformer (366) performs an inverse frequency transform, producing blocks/sub-blocks of reconstructed prediction residuals or pixel values. For a predicted picture, the encoder (300) combines reconstructed prediction residuals (345) with motion-compensated predictions (335) to form the reconstructed picture (305). (Although not shown in FIG. 3, in the intra path, the encoder (300) can combine prediction residuals with spatial predictions from intra prediction.) The picture store (320) buffers the reconstructed current picture for use in subsequent motion-compensated prediction. A motion compensation loop in the encoder (300) includes an adaptive in-loop deblock filter (310) before or after the picture store (320). The decoder (300) applies in-loop filtering to reconstructed pictures to adaptively smooth discontinuities across boundaries in the pictures. Section IV describes examples of multi-threaded implementations of in-loop deblock filtering.

The entropy coder (380) compresses the output of the quantizer (370) as well as motion information (315) and certain side information (e.g., quantization step size). The entropy coder (380) provides encoded data (395) to the buffer (390), which multiplexes the encoded data into an output bitstream A controller (not shown) receives inputs from various modules of the encoder. The controller evaluates intermediate results during encoding, for example, setting quantization step sizes and performing rate-distortion analysis. The controller works with other modules to set and change coding parameters during encoding.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (300). The relationships shown between modules within the encoder (300) indicate general flows of information in the encoder; other relationships are not shown for the sake of simplicity.

III. Example Decoders.

Figure 4:
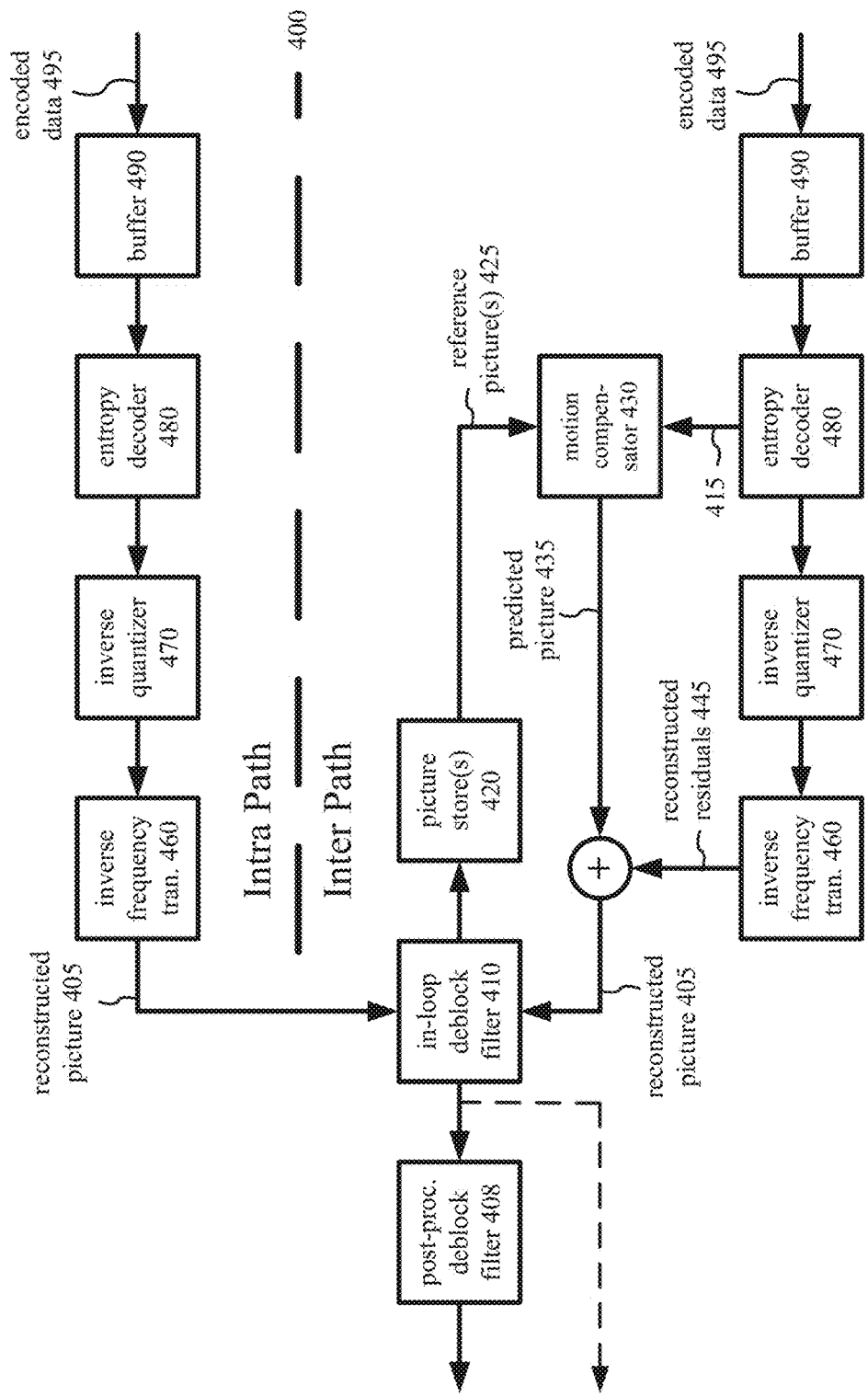
FIG. 4 is a block diagram of a generalized video decoder in conjunction with which several of the described embodiments may be implemented.

FIG. 4 is a block diagram of a generalized decoder (400) in conjunction with which several described embodiments may be implemented. The decoder (400) receives encoded data (495) for a compressed picture or sequence of pictures and produces output including a reconstructed picture (405). For the sake of presentation, FIG. 4 shows an "intra path" through the decoder (400) for intra-picture decoding and an "inter path" for inter-picture decoding. Many of the components of the decoder (400) are used for both intra-picture decoding and inter-picture decoding. The exact operations performed by those components can vary depending on the type of information being decompressed.

A buffer (490) receives encoded data (495) for a compressed picture and makes the received encoded data available to the entropy decoder (480). The entropy decoder (480) entropy decodes entropy-coded quantized data as well as entropy-coded side information, typically applying the inverse of entropy encoding performed in the encoder.

A motion compensator (430) applies motion information (415) to one or more reference pictures (425) to form motion-compensated predictions (435) of sub-blocks, blocks and/or macroblocks of the picture (405) being reconstructed. The picture store (420) stores one or more previously reconstructed pictures for use as reference pictures.

The intra path can include an intra prediction module (not shown) that spatially predicts pixel values of a current block or sub-block from neighboring, previously reconstructed pixel values. In the inter path, the decoder (400) reconstructs prediction residuals. An inverse quantizer (470) inverse quantizes entropy-decoded data. An inverse frequency transformer (460) converts the quantized, frequency domain data into spatial domain information. For example, the inverse frequency transformer (460) applies an inverse block transform to frequency transform coefficients, producing pixel value data or prediction residual data. The inverse frequency transform can be an inverse discrete cosine transform, an integer approximation thereof, or another type of inverse frequency transform.

For a predicted picture, the decoder (400) combines reconstructed prediction residuals (445) with motion-compensated predictions (435) to form the reconstructed picture (405). (Although not shown in FIG. 4, in the intra path, the decoder (400) can combine prediction residuals with spatial predictions from intra prediction.) A motion compensation loop in the decoder (400) includes an adaptive in-loop deblock filter (410) before or after the picture store (420). The decoder (400) applies in-loop filtering to reconstructed pictures to adaptively smooth discontinuities across boundaries in the pictures. Section IV describes examples of multi-threaded implementations of in-loop deblock filtering.

The decoder (400) also includes a post-processing deblock filter (408). The post-processing deblock filter (408) optionally smoothes discontinuities in reconstructed pictures. Other filtering (such as de-ring filtering) can also be applied as part of the post-processing filtering. The post-processing filtering can be performed in addition to in-loop deblock filtering (see main path in FIG. 4) or not at all (see dashed lines in FIG. 4). Or (not shown in FIG. 4), the post-processing deblock filtering can be performed instead of the in-loop deblock filtering, or both can be skipped. Section IV describes examples of multi-threaded implementations of post-processing deblock filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (400). The relationships shown between modules within the decoder (400) indicate general flows of information in the decoder; other relationships are not shown for the sake of simplicity.

IV. Example Multi-Threaded Implementations of Deblock Filtering.

In-loop deblock filtering is a computationally intensive part of video encoding and decoding, especially for high-definition, high-quality video. In-loop deblock filtering operations can be applied to hundreds or even thousands of boundaries between blocks and sub-blocks in a single video picture, for a video sequence that includes 30, 60 or even more pictures per second. Post-processing deblock filtering can also be computationally intensive for a video decoder. In theory, a computing system with multiple processing cores often has processing power available for deblock filtering. In practice, separating the operations of deblock filtering into multiple tasks that can be processed in parallel is difficult. As a result, the raw processing power of multi-core computing systems has not been effectively utilized for many coding and decoding scenarios.

For example, suppose a video frame is split into four segments (where each segment includes multiple rows of blocks), and in-loop deblock filtering for the four segments is assigned to four different threads, respectively. One thread per segment performs all in-loop deblock filtering for that segment. If the filtering for a given segment cannot begin until all filtering is completed for the previous segment, threads will be idle. Simply having multiple threads available for in-loop deblock filtering does not guarantee good performance.

In general, an efficient multi-threading design divides operations into multiple independent tasks so that different tasks can be performed in parallel. Various described techniques and tools facilitate multi-threaded deblock filtering by breaking deblock filtering into tasks that can be performed with different threads concurrently. Described techniques and tools allow deblock filtering to be performed flexibly and efficiently, with the ability to scale multi-thread processing depending on the number of processing cores being used.

A deblock filtering task for a given segment may depend on one or more other deblock filtering tasks for the given segment and/or one or more other segments in the picture. Analysis of task dependencies is performed to determine which tasks are currently "runnable." A deblock filtering task is considered to be runnable, for example, if its performance does not depend on any other uncompleted deblock filtering task for the picture. For a given video coding/decoding standard or format, for example, in-loop deblock filtering can have different combinations of task dependencies depending on frame coding mode (FCM) (such as progressive, interlaced field, or interlaced frame), picture coding type (such as I, P, B or BI) and/or another factor. Available hardware threads perform runnable tasks. In general, the available threads are not limited to performing deblock filtering tasks. In some cases, however, specialized processors are limited in the kinds of tasks they can perform. The term "thread" as used herein encompasses a hardware thread bound or otherwise associated with a particular processing core or a generic software thread.

A. Partitioning a Picture into Segments.

Figure 5:
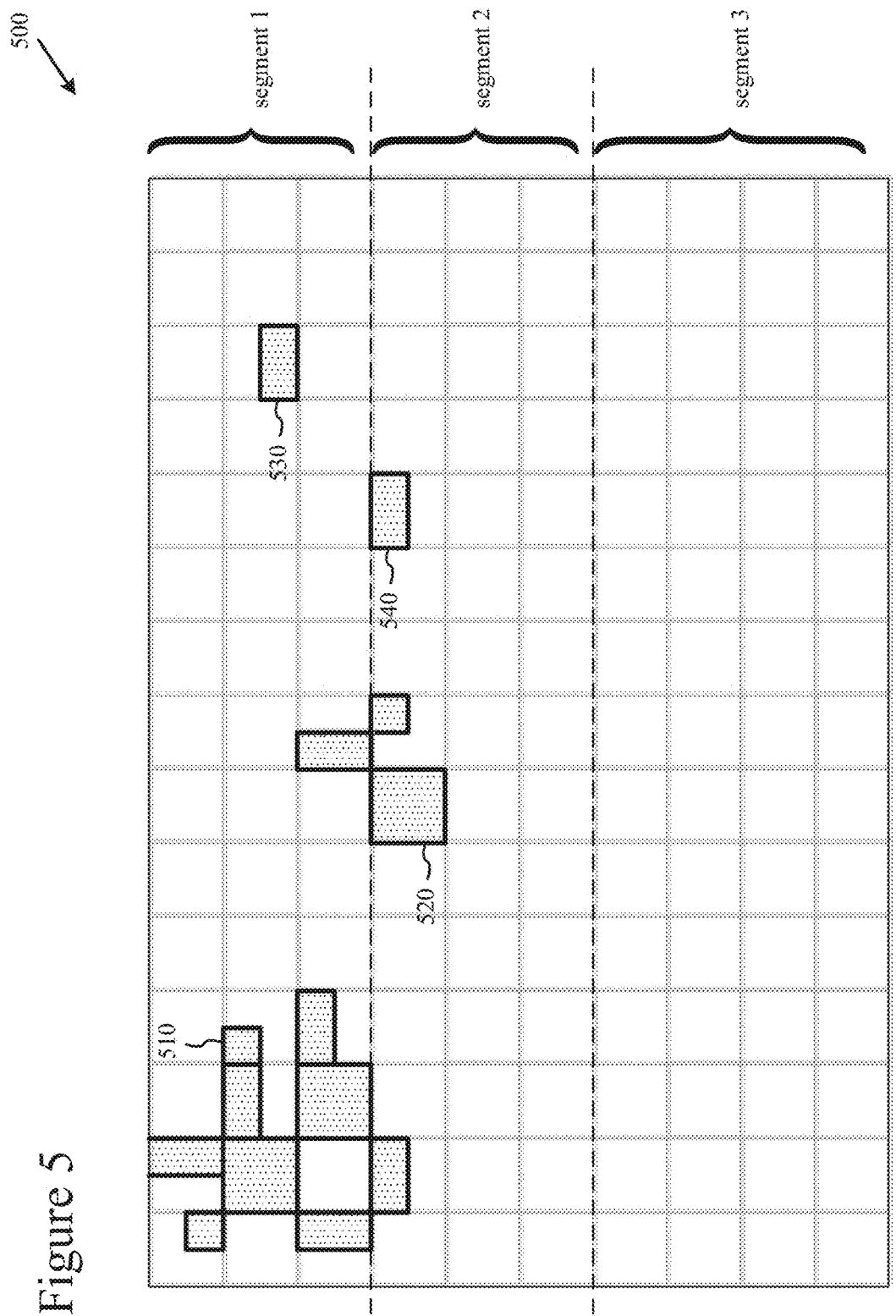
FIG. 5 is a diagram of an example picture split into multiple segments and blocks/sub-blocks of the example picture.

To facilitate multi-threaded deblock filtering, a picture is partitioned into multiple segments. FIG. 5 shows an example picture (500) partitioned into three segments. Each of the three segments includes multiple rows of 8×8 blocks of the picture (500). For lines of pixel values starting at line 0, segment 1 includes horizontal block boundaries between lines (7, 8), (15, 16) and (23, 24). Segment 1 also can include horizontal sub-block boundaries between lines (3, 4), (11, 12), and (19, 20). Segments 2 and 3 similarly include horizontal block boundaries and horizontal sub-block boundaries. Segments 1, 2 and 3 include vertical block boundaries between vertical lines (7, 8), . . . , (111, 112), and can include vertical sub-block boundaries between vertical lines (3, 4), . . . , (115, 116).

FIG. 5 also illustrates simple arrangements (510, 520, 530, 540) of coded blocks and sub-blocks. Coded blocks/sub-blocks are shaded. The non-shaded blocks/sub-blocks are inter, have the same motion vector, and are non-coded (lack transform coefficient information in the bitstream). In FIG. 5, thick lines represent block or sub-block boundaries that are adaptively filtered, and thin lines represent block boundaries that are not filtered. FIG. 5 is a highly simplified diagram. In practice, a video picture is usually much larger, and in-loop deblock filtering (and/or post-processing deblock filtering) is selectively performed throughout the picture.

In FIG. 5, the third segment in the picture (500) has more blocks than the other segments. The segments of a picture can have the same size or different sizes. Having segments of roughly the same size makes it more likely for different threads to be utilized in parallel, with no thread finishing long before others. For some sizes of pictures, however, equal size segments are not an option.

In FIG. 5, the boundaries of the segments are shown with dashed lines. The segment boundaries align with block boundaries. Having segment boundaries align with block boundaries affects task dependencies, as explained below. Alternatively, segment boundaries can align with sub-block boundaries or simply align with boundaries between lines of pixel values in the picture, with corresponding changes to task dependencies.

In FIG. 5, the multiple segments are horizontally oriented in the picture (500). In some cases, using horizontal segments permits splitting horizontal block boundary filtering operations and horizontal sub-block boundary filtering operations into different passes, as explained below. Alternatively, the multiple segments of a picture can be vertically oriented. In this case, vertical block boundary filtering operations can be performed in one pass, with vertical sub-block boundary filtering operations performed in a different pass.

Although the picture (500) of FIG. 5 includes three segments, alternatively a picture is partitioned into more or fewer segments. The number of segments can be set depending on the number of threads to be used for deblock filtering, which in turn can depend on the number of processing units in a computing system.

B. Selecting a Pattern for Multiple Passes of in-Loop Deblock Filtering.

To facilitate multi-threaded in-loop deblock filtering, operations of the deblock filtering are split into multiple passes. The way that the operations are split into multiple passes typically depends on the standard or format according to which the in-loop deblock filtering is defined. A standard or format describes rules for adaptive filtering and may also define an order in which operations are performed. For example, according to the VC-1 standard (SMPTE 421M), an encoder or decoder adaptively filters horizontal boundaries then adaptively filters vertical boundaries within a frame, field or slice. In contrast, other standards define filtering that is performed on a macroblock-by-macroblock basis.

Even for a single standard or format, the way that operations of in-loop deblock filtering are split into multiple passes can be different for different pictures. According to the VC-1 standard, for example, the in-loop deblock filtering process can change depending on the FCM and picture coding type of a picture, potentially filtering block boundaries and/or sub-block boundaries in any of several different processing orders. For additional details, see sections 8.6 and 10.10 of the VC-1 standard.

Therefore, in example implementations that use segmentation and multiple passes, in-loop deblock filtering operations for a picture are separated into multiple passes based on factors such as FCM and picture coding type. In some cases, each of the multiple segments is independent of the other segments inside in the same pass, which facilitates processing in parallel with multiple cores. At the same time, the in-loop filtering generally produces results conformant with the standard or format. Sections IV.C to IV.E describe passes and task dependencies for multi-threaded in-loop deblock filtering of pictures with different values of FCM and picture coding type in example implementations for a VC-1 decoder or encoder.

C. Example in-Loop Deblock Filtering Passes and Dependencies for Progressive Video Frames.

According to the VC-1 standard, a progressive video frame can have picture coding type of I, P, B or BI. Section 8.6 of the VC-1 standard defines rules for in-loop deblock filtering of boundaries of blocks and sub-blocks of a progressive video frame. Generally, the boundary between a block or sub-block and its neighbor block/sub-block is filtered unless (a) both are inter (not intra-coded), (b) both have the same motion vector, and (c) both are not coded (no transform coefficients in the bitstream).

1. Progressive I Frame, BI Frame or B Frame.

According to the VC-1 standard, a progressive I frame or progressive BI frame includes blocks with an 8×8 transform size. A progressive B frame can include inter-coded blocks with an 8×8, 8×4, 4×8 or 4×4 transform size or intra-coded 8×8 blocks, but sub-block boundaries are not filtered during in-loop deblock filtering. For in-loop deblock filtering of a progressive I frame, B frame or BI frame, horizontal block boundaries are adaptively filtered, then vertical block boundaries are adaptively filtered.

In example implementations, deblock filtering operations are split into two passes:
  Pass 1: adaptive filtering of any horizontal block boundaries to be filtered between horizontal lines at (7, 8), (15, 16), . . . , ((H−1)*8−1, (H−1)*8); and
  Pass 2: adaptive filtering of any vertical block boundaries to be filtered between vertical lines at (7, 8), (15, 16), . . . , ((W−1)*8−1, (W−1)*8);
where the frame starts at line 0, H indicates the height of the frame in 8×8 blocks, and W indicates the width of the frame in 8×8 blocks. For each of the two passes, the progressive I, B or BI frame is partitioned into multiple segments (e.g., to match the number of threads used for in-loop deblock filtering). The segment boundaries align with 8×8 block boundaries. For passes and segments defined in this way, within each of the two passes, a given segment can be filtered independently of other segments due to lack of task dependencies on other segments in that pass. On the other hand, for a given segment, the vertical filtering pass is dependent on completion of the horizontal filtering pass for that segment.

2. Progressive P Frame.

According to the VC-1 standard, a progressive P frame can include inter-coded blocks with an 8×8, 8×4, 4×8 or 4×4 transform size or intra-coded 8×8 blocks, and sub-block boundaries are filtered during in-loop deblock filtering. For in-loop deblock filtering, horizontal block boundaries are adaptively filtered in the frame, then horizontal sub-block boundaries, then vertical block boundaries, and then vertical sub-block boundaries in the frame.

In example implementations, deblock filtering operations are split into four passes:
  Pass 1: analyze which block boundaries and sub-boundaries are to be adaptively filtered, to make at least some filtering decisions per segment;
  Pass 2: adaptive filtering of any horizontal block boundaries to be filtered between horizontal lines at (7, 8), (15, 16), . . . , ((H−1)*8−1, (H−1)*8);
  Pass 3: adaptive filtering of any horizontal sub-block boundaries to be filtered between horizontal lines at (3, 4), (11, 12), . . . , ((H−1)*8+3, (H−1)*8+4); and
  Pass 4: adaptive filtering of any vertical boundaries to be filtered between vertical lines at (3, 4), (7, 8), . . . , ((W−1)*8−1, (W−1)*8), ((W−1)*8+3, (W−1)*8+4);
where H and W indicates the height and width, respectively, of the frame in 8×8 blocks. For each of the four passes, the progressive P frame is partitioned into multiple segments (e.g., to match the number of threads used for in-loop deblock filtering). The segment boundaries align with 8×8 block boundaries. For passes and segments defined in this way, within each of the four passes, a given segment can be filtered independently of other segments due to lack of task dependencies on other segments in that pass. On the other hand, there are task dependencies from pass-to-pass for a given segment and, in some cases, task dependencies from one pass of a given segment to another pass of an adjacent segment.

Figure 6:
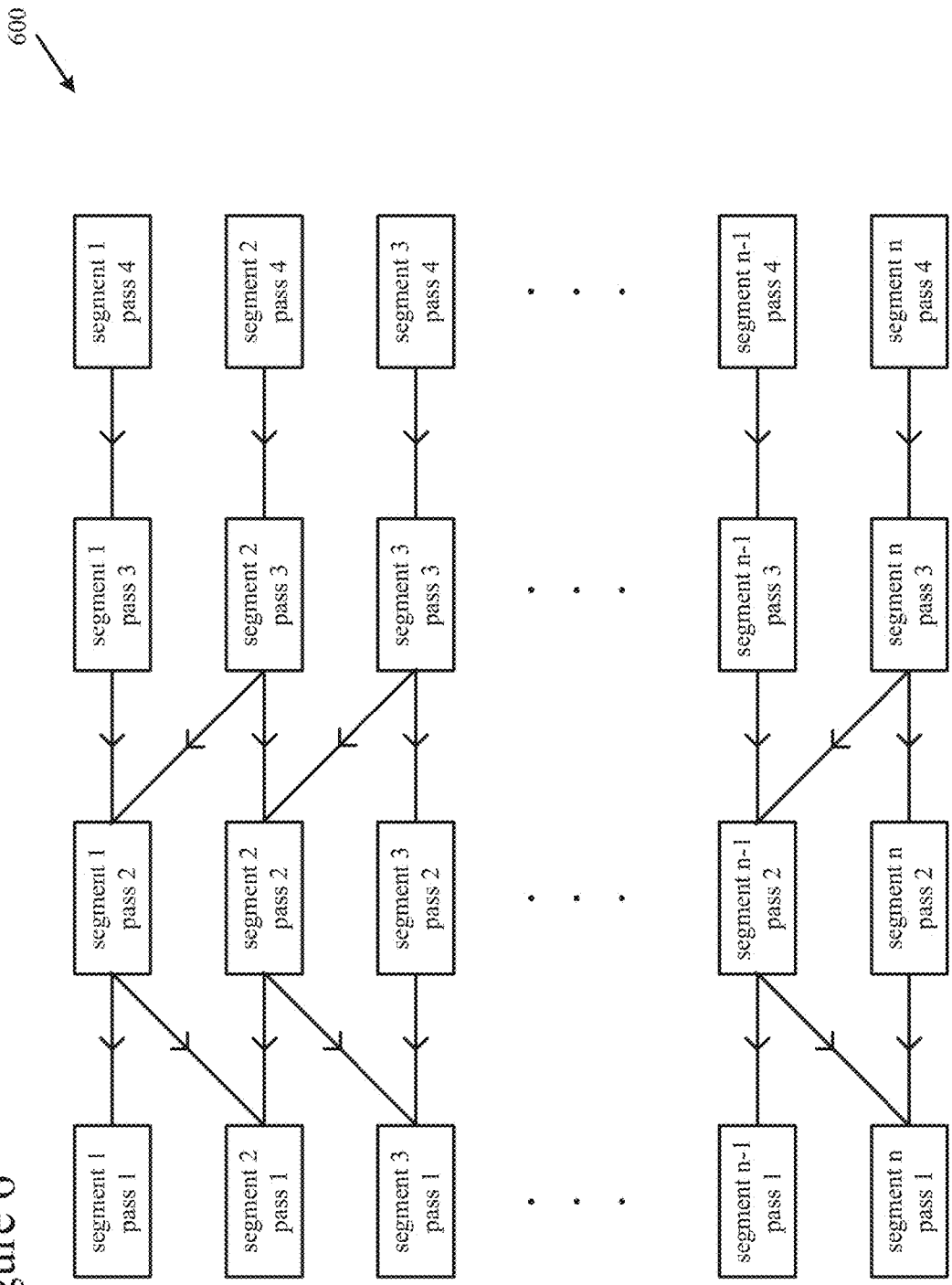
FIG. 6 is a diagram of task dependencies between in-loop deblock filtering operations for multiple segments of an example progressive frame or interlaced video field.

FIG. 6 shows task dependencies for multi-threaded in-loop deblock filtering of a progressive P frame divided into n segments, for the four passes defined above. If a given task is dependent on another task, the given task does not begin until the other task has completed. Arrow lines indicate direction of the task dependencies. For example, the task for segment 1 pass 2 is dependent on the completion of the tasks for segment 1 pass 1 and segment 2 pass 1. Similarly, the task for segment 1 pass 3 depends on completion of the task for segment 1 pass 2. In FIG. 6, the segments are defined the same way during all four passes.

In pass 1 (boundary analysis), the multiple segments are independent of each other. In some cases, the analysis for a given boundary will depend on the status of blocks or sub-blocks in different segments. In general, different threads have concurrent access to the buffered picture that is loop filtered. Pass 1 includes analysis of which boundaries are to be filtered (e.g., considering intra/inter status, motion vectors, coded/not coded status) but some analysis can be deferred until later passes (e.g., checking a $3^{rd}$ pixel pair along a 4-pixel value segment to determine whether the 4-pixel value segment is conditionally filtered).

The results of pass 1 can be stored as loop filter flags per block. For example, the loop filter flags are represented with one byte per 8×8 block, where (a) two bits indicate filter decisions for the two 4-value edges of the top horizontal block boundary, (b) two bits indicate filter decisions for the two 4-value edges of the internal horizontal sub-block boundary, (c) two bits indicate filter decisions for the two 4-value edges of the left vertical block boundary, and (d) two bits indicate filter decisions for the two 4-value edges of the internal vertical sub-block boundary. For additional details about loop filter flags, see U.S. Patent Application Publication No. 2008/0084932. Alternatively, the results of pass 1 are stored using some other representation.

For pass 2 (adaptive filtering of horizontal block boundaries), a given segment is dependent on completion of the first pass for the given segment. The adaptive filtering of horizontal block boundaries in the segment uses boundary analysis information (such as loop filter flags) from pass 1 for the segment. Pass 2 for a given segment may also be dependent on completion of pass 1 for an adjacent segment, where pass 2 for the given segment includes filtering of the bottom horizontal block boundaries of the given segment. This can happen, for example, when filtering of a bottom horizontal block boundary for the segment uses boundary analysis information (such as loop filter flags) computed for a top horizontal block boundary of the following segment in the picture. In FIG. 5, the arrangement (510) includes several horizontal block boundaries that align with the segment boundary between segments 1 and 2. The horizontal block boundaries can be filtered as part of pass 2 for segment 1 but depend on boundary analysis information from pass 1 of segment 2 (e.g., loop filter flags for the two 4-value top edges of a block that is in segment 2). In other cases, pass 2 filtering for a given segment is not dependent on completion of pass 1 filtering for any adjacent segment. For example, in FIG. 6, pass 2 for the final segment is only dependent on completion of pass 1 for the final segment.

For pass 3 (adaptive filtering of horizontal sub-block boundaries), a given segment is dependent on completion of the horizontal block boundary filtering (pass 2) for the segment. In FIG. 5, the sub-block (530) includes a horizontal sub-block boundary (top edge of sub-block (530)) whose filtering may use pixel values adjusted as a result of horizontal block boundary filtering of the bottom edge of the sub-block (530). The horizontal sub-block boundary filtering for a given segment may also be dependent on completion of horizontal block boundary filtering for an adjacent segment, where the sub-block boundary filtering (pass 3) uses pixel values set in block boundary filtering (pass 2) of the adjacent segment. For example, in FIG. 5, the sub-block (540) is part of segment 2, but pass 3 filtering for the bottom edge of the sub-block (540) may use pixel values set in pass 2 filtering of the top edge of the sub-block (540) for segment 1. In FIG. 6, the horizontal sub-block boundary filtering (pass 3) for segment 2 depends on completion of horizontal block boundary filtering (pass 2) for segment 1, since the pass 3 filtering for segment 2 may use pixel values set in pass 2 filtering at the bottom of segment 1. In other cases, the pass 3 filtering for a given segment is not dependent on completion of the pass 2 filtering for any adjacent segment. For example, in FIG. 6, pass 3 for segment 1 depends only on completion of pass 2 for segment 1.

For pass 4 (adaptive filtering of vertical block and/or sub-block boundaries), the multiple segments are independent of each other for pass 4 filtering, but a given segment is dependent on completion of pass 3 for the given segment. Upon completion of pass 3 filtering for the segment, pixel values are set in support regions for pass 4 filtering for the segment. For example, in FIG. 5, the arrangement (520) includes an 8×8 block in segment 2 for which vertical block boundaries are filtered. The pass 4 filtering of the vertical block boundaries may use pixel values set in pass 2 filtering for segment 1 and pixel values set in pass 2 filtering for segment 2, but both are understood to be completed due to the dependence of pass 3 filtering for segment 2 on them. The arrangement (520) also includes a 4×4 block in segment 2 for which a vertical sub-block boundary is filtered. The pass 4 filtering of the vertical sub-block boundary may use pixel values set in pass 2 filtering for segment 1 and pixel values set in pass 3 filtering for segment 2, which are both completed before the pass 4 filtering for segment 2 begins. In FIG. 6, pass 4 filtering for a given segment depends only on completion of pass 3 filtering for the given segment.

D. Example in-Loop Deblock Filtering Passes and Dependencies for Interlaced Video Fields.

According to the VC-1 standard, an interlaced video field can have picture coding type of I, P, B or BI. Sections 10.10.1 to 10.10.3 of the VC-1 standard define rules for in-loop deblock filtering of boundaries of blocks and sub-blocks of an interlaced video field.

1. Interlaced I Field or BI Field.

According to the VC-1 standard, an interlaced I field or interlaced BI field includes blocks with an 8×8 transform size. For in-loop deblock filtering of an interlaced I field or interlaced BI field, the interlaced field is filtered much like a progressive I frame or B frame. Horizontal block boundaries are adaptively filtered, then vertical block boundaries are adaptively filtered.

In example implementations, deblock filtering operations are split into two passes:

Pass 1: adaptive filtering of any horizontal block boundaries to be filtered between horizontal lines at (7, 8), (15, 16), . . . , ((H−1)*8−1, (H−1)*8); and Pass 2: adaptive filtering of any vertical block boundaries to be filtered between vertical lines at (7, 8), (15, 16), . . . , ((W−1)*8−1, (W−1)*8);

where H and W indicate the height and width, respectively, of the field (not frame) in 8×8 blocks. For each of the two passes, the interlaced I or BI field is partitioned into multiple segments whose boundaries align with 8×8 block boundaries. For passes and segments defined in this way, within each of the two passes, a given segment can be filtered independently of other segments due to lack of task dependencies on other segments in that pass. On the other hand, for a given segment, the vertical filtering pass is dependent on completion of the horizontal filtering pass for that segment.

2. Interlaced P Field or B Field.

According to the VC-1 standard, an interlaced P field or B field can include inter-coded blocks with an 8×8, 8×4, 4×8 or 4×4 transform size or intra-coded 8×8 blocks, and sub-block boundaries are filtered during in-loop deblock filtering. For in-loop deblock filtering of an interlaced P field or B field, the field is filtered much like a progressive P frame. Horizontal block boundaries are adaptively filtered in the field, then horizontal sub-block boundaries, then vertical block boundaries, and then vertical sub-block boundaries in the field.

In example implementations, deblock filtering operations are split into four passes:

Pass 1: analyze which block boundaries and sub-boundaries are to be adaptively filtered, to make at least some filtering decisions per segment;

Pass 2: adaptive filtering of any horizontal block boundaries to be filtered between horizontal lines at (7, 8), (15, 16), . . . , ((H−1)*8−1, (H−1)*8);

Pass 3: adaptive filtering of any horizontal sub-block boundaries to be filtered between horizontal lines at (3, 4), (11, 12), . . . , ((H−1)*8+3, (H−1)*8+4); and Pass 4: adaptive filtering of any vertical (block and sub-block) boundaries to be filtered between vertical lines at (3, 4), (7, 8), . . . , ((W−1)*8−1, (W−1)*8), ((W−1)*8+3, (W−1)*8+4);

where H and W indicate the height and width, respectively, of the field in 8×8 blocks. For each of the four passes, the interlaced P field or B field is partitioned into multiple segments, and segment boundaries align with 8×8 block boundaries. For passes and segments defined in this way for an interlaced P field or B field, the tasks dependencies for the passes and segments are the same as for a progressive P frame, as shown in FIG. 6.

E. Example in-Loop Deblock Filtering Passes and Dependencies for Interlaced Video Frames.

According to the VC-1 standard, an interlaced video frame can have picture coding type of I, P, B or BI. An interlaced video frame is split into 8×8 blocks, and inter-coded blocks of an interlaced P frame or B frame may be further split into 8×4, 4×8 or 4×4 sub-blocks. Section 10.10.4 of the VC-1 standard defines rules for in-loop deblock filtering of boundaries of blocks and sub-blocks of an interlaced video frame.

An interlaced video frame includes a top field and a bottom field, whose lines are interleaved in the frame. Filtering lines of the two fields together can introduce blurring and distortion when the fields are scanned at different times. Thus, an encoder/decoder filters top field lines separately from bottom field lines during in-loop deblock filtering. For example, for a horizontal block boundary between a current block and a neighboring block above it, pixel values of the two top field lines on opposing sides of the block boundary are filtered across the boundary using pixel values of top field lines only, and pixel values of the two bottom field lines on opposing sides of the block boundary are filtered using pixel values of bottom field lines only. For a vertical block boundary, pixel values of the top field lines on opposing sides of the boundary are filtered across the boundary, and pixel values of the bottom field lines on opposing sides of the boundary are separately filtered across the boundary.

The support region of the filter used for the deblock filtering includes four pixel values on each side of a boundary being filtered. The pixel values are numbered P1 to P8 in the VC-1 standard, where the boundary being filtered separates P4 and P5, and where the values of P4 and P5 may change as a result of the filtering. Due to the support region of the filter and the order that filtering operations are performed, horizontal boundary filtering has a boundary-to-boundary dependency from top to bottom within a given field. (The boundary filtering that sets the values P4 and P5 uses pixel values P1, P2 and P3, and one or more of P1, P2 and P3 may have been set in filtering of a horizontal boundary above.) On the other hand, horizontal boundary filtering for the top field is independent of horizontal boundary filtering for the bottom field. Also, vertical boundary filtering inside a given segment is independent of vertical boundary filtering for other segments.

Figure 7:
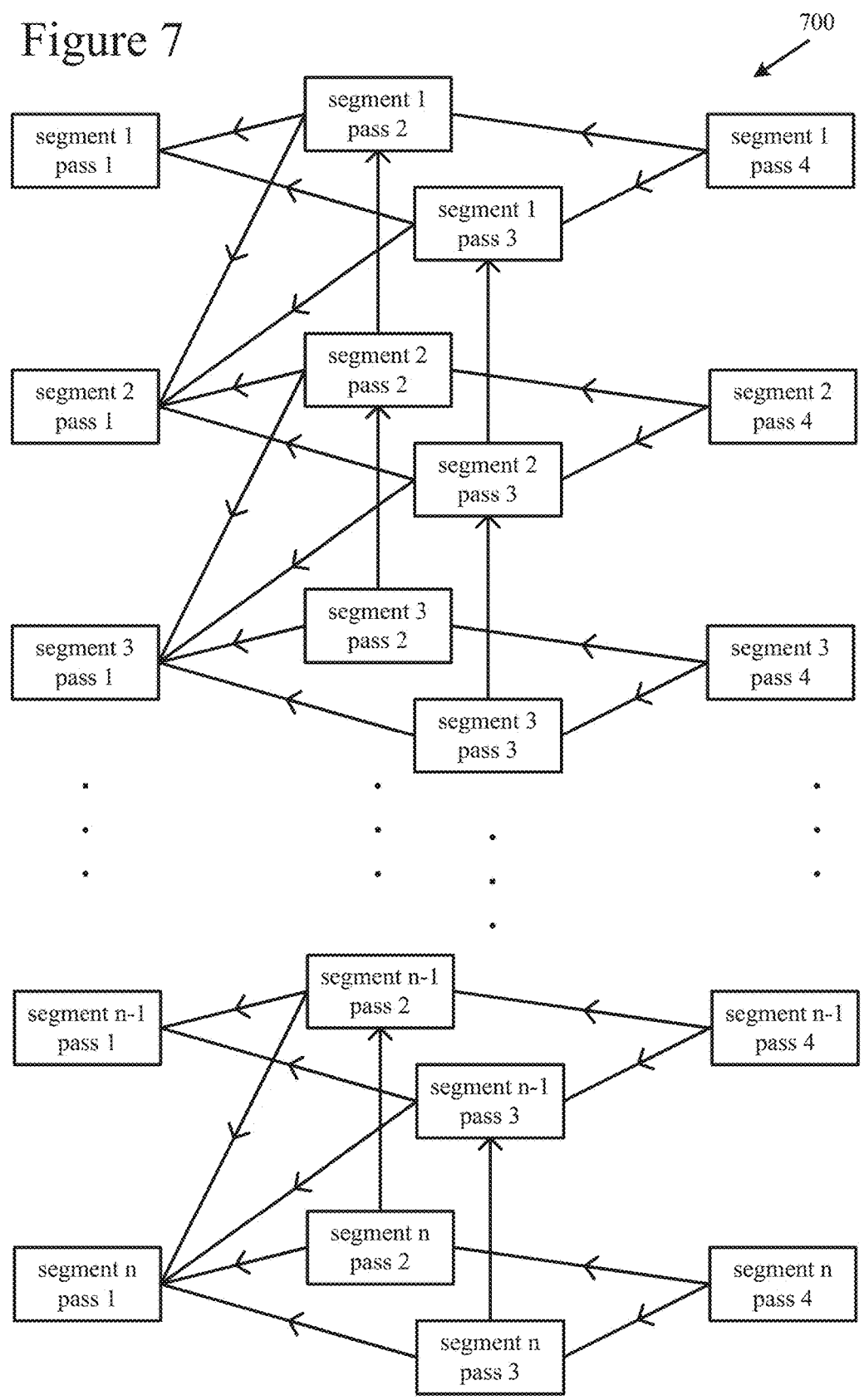
FIG. 7 is a diagram of task dependencies between in-loop deblock filtering operations for multiple segments of an example interlaced video frame.

In example implementations, in-loop deblock filtering operations for an interlaced I, P, B or BI frame are split into four passes:

Pass 1: analyze which block boundaries and sub-boundaries are to be adaptively filtered, to make at least some filtering decisions per segment;

Pass 2: adaptive filtering of any horizontal boundaries to be filtered for the top field between horizontal lines at (2, 4), (6, 8), (10, 12), (14, 16), . . . , ((H−1)*8−2, (H−1)*8), ((H−1)*8+2, ((H−1)*8+4);

Pass 3: adaptive filtering of any horizontal boundaries to be filtered for the bottom field between horizontal lines at (3, 5), (7, 9), (11, 13), (15, 17), . . . , ((H−1)*8−1, (H−1)*8+1), ((H−1)*8+3, ((H−1)*8)+5); and Pass 4: adaptive filtering of any vertical boundaries to be filtered for the top field and the bottom field between vertical lines at (3, 4), (7, 8), . . . , ((W−1)*8−1, (W−1)*8), ((W−1)*8+3, (W−1)*8+4);

where H and W indicate the height and width, respectively, of the frame in 8×8 blocks. Only block boundaries are filtered for an interlaced I frame or BI frame, but block or sub-block boundaries may be filtered for an interlaced P frame or B frame. For each of the four passes, the interlaced frame is partitioned into multiple segments, and segment boundaries align with 8×8 block boundaries. FIG. 7 shows task dependencies for multi-threaded in-loop deblock filtering of an interlaced frame divided into n segments, for the four passes defined above.

In pass 1 (boundary analysis), the multiple segments are independent of each other. Pass 1 includes analysis of which boundaries are to be filtered (e.g., considering intra/inter status, motion vectors, coded/not coded status) but some analysis can be deferred until later passes (e.g., checking a $3^{rd}$ pixel pair along a 4-pixel value segment to determine whether the 4-pixel value segment is conditionally filtered). The results of Pass 1 can be stored as loop filter flags per block or stored using some other representation. Again, for additional details about loop filter flags, see U.S. Patent Application Publication No. 2008/0084932.

For pass 2 (adaptive filtering of horizontal boundaries for the top field), a given segment is dependent on completion of pass 1 for the given segment. The adaptive filtering of horizontal boundaries in the segment uses boundary analysis information (such as loop filter flags) from pass 1 for the segment. Pass 2 for a given segment may also be dependent on completion of pass 1 for an adjacent segment, where pass 2 for the given segment includes filtering of the bottom horizontal block boundaries of the given segment. In other cases, pass 2 filtering for a given segment is not dependent on completion of pass 1 filtering for any adjacent segment.

For example, in FIG. 7, pass 2 for the final segment is only dependent on completion of pass 1 for the final segment. Within pass 2, there is a segment-to-segment dependency from top to bottom due to boundary-to-boundary dependencies for horizontal boundaries, as explained above. As shown in FIG. 7, pass 2 filtering for segment 2 depends on completion of pass 2 filtering for segment 1, pass 2 filtering for segment 3 depends on completion of pass 2 filtering for segment 2, and so on. Thus, pass 2 filtering for a given segment is dependent on completion of (a) pass 1 filtering for the segment, (b) in some cases, pass 2 filtering for a first adjacent (above) segment and (c) in some cases, pass 1 filtering for a second adjacent (below) segment. Horizontal boundary filtering for the top field (pass 2) is independent of horizontal boundary filtering for the bottom field (pass 3).

The task dependencies for pass 3 are analogous to the task dependencies for pass 2. Thus, pass 3 filtering for a given segment is dependent on completion of (a) pass 1 filtering for the segment, (b) in some cases, pass 3 filtering for a first adjacent (above) segment and (c) in some cases, pass 1 filtering for a second adjacent (below) segment.

For pass 4 (adaptive filtering of vertical boundaries), the multiple segments are independent of each other, but a given segment is dependent on completion of both pass 2 (horizontal filtering for the top field) and pass 3 (horizontal filtering for the bottom field) for the given segment. Upon completion of the pass 2 filtering and pass 3 filtering for the segment, pixel values are set in support regions for pass 4 filtering for the segment.

F. Example Post-Processing Deblock Filtering Passes and Dependencies.

To facilitate multi-threaded post-processing deblock filtering, operations of the deblock filtering are split into multiple passes. The way that the operations are split into multiple passes typically depends on implementation.

A standard or format may document rules for adaptive post-processing filtering, an order in which operations are performed, and circumstances in which post-processing deblock filtering should be performed. For example, the VC-1 standard describes adaptive post-processing deblock filtering of 8×8 blocks of a reconstructed frame, according to which a decoder adaptively filters horizontal boundaries from top to bottom in the frame, then adaptively filters vertical boundaries from left to right in the frame. Generally, the boundary between a block and its neighbor block is adaptively filtered depending on metadata signaled in the bitstream, smoothness of pixel values across the boundary, and quantization parameters (passed as metadata to the post-processing deblock filter) applicable for the blocks. For details, see Annex H.1 of the VC-1 standard. The post-processing deblock filtering is not required for correct VC-1 decoding—a VC-1 decoder may perform such post-processing deblock filtering, perform different post-processing deblock filtering, or perform no post-processing deblock filtering at all. In other standards or formats, post-processing deblock filtering can be a normative part of the standard/format and hence required for decoding, or documented but optional for decoding, or completely left to decoder implementation.

In example implementations that use segmentation and multiple passes, post-processing deblock filtering operations for a frame are separated into multiple passes. Typically, each of the multiple segments is independent of the other segments inside in the same pass, which facilitates processing in parallel with multiple cores. In such example implementations, deblock filtering operations are split into two passes for a progressive video frame:

Pass 1: adaptive filtering of any horizontal block boundaries to be filtered between horizontal lines at (7, 8), (15, 16), . . . , ((H−1)*8−1, (H−1)*8); and Pass 2: adaptive filtering of any vertical block boundaries to be filtered between vertical lines at (7, 8), (15, 16), . . . , ((W−1)*8−1, (W−1)*8);

where H and W indicate the height and width, respectively, of the frame in 8×8 blocks. For each of the two passes, the frame is partitioned into multiple segments (e.g., to match the number of threads used for deblock filtering). The segment boundaries align with 8×8 block boundaries. For passes and segments defined in this way, within each of the two passes, a given segment can be filtered independently of other segments due to lack of task dependencies on other segments in that pass. On the other hand, for a given segment, the vertical filtering pass is dependent on completion of the horizontal filtering pass for that segment and may also be dependent on completion of the horizontal filtering pass for an adjacent segment. For an interlaced video frame, the post-processing deblock filtering can filter boundaries between the same lines as for a progressive video frame, or top field lines can be filtered separately from bottom field lines.

G. Filtering Passes and Dependencies, Generally.

The task dependencies for multi-threaded deblock filtering depend on the number of segments, which lines are filtered as part of each segment, and which filtering operations are part of the respective passes. In the preceding examples of sections IV.C to IV.F, segment boundaries align with block boundaries, boundary analysis decisions for in-loop deblock filtering are noted for top block edges but not bottom block edges per block, and bottom block boundaries (but not top block boundaries) are filtered as part of horizontal filtering for a given segment. Alternatively, segment boundaries do not align with block boundaries, boundary analysis decisions are represented differently and/or filtering for boundaries at segment transitions is handled differently, in which case the task dependencies between segments and passes change accordingly. In general, filtering in a given pass for a given segment is dependent on completion of filtering in another pass/segment (that is, the given pass for a different segment, an earlier pass for the given segment, or an earlier pass for a different segment) if the filtering in the given pass/segment uses decision information determined in the other pass/segment, uses conditional check results from the other pass/segment, or uses (as part of the support region for filtering in the given pass/segment) pixel values that are set in filtering of the other pass/segment.

In the preceding examples of sections IV.C to IV.F, task dependencies do not depend on content to be filtered. Alternatively, the content being filtered can be considered to selectively remove certain task dependencies. For example, if no horizontal block boundaries are filtered at the bottom of segment 1, the horizontal sub-block boundary filtering (pass 3) for segment 2 need not wait for the completion of pass 2 of segment 1.

Also, the convention for handling filtering at transitions between segments depends on implementation. For example, at a transition between segments, filtering for one segment can adjust pixel values in lines on both sides of the transition, including pixel values in the adjacent segment, which simplifies reuse of intermediate computations (such as threshold measures a1, a2 and a3 and intermediate values d and clip according to the VC-1 standard) for the filtering along the transition. For example, in FIG. 5, horizontal block boundary filtering (pass 2) for segment 1 potentially adjusts pixel values in the bottom line of segment 1 and top line of segment 2. Alternatively, filtering for each segment adjusts pixel values in any lines within the segment, potentially considering pixel values in an adjacent segment but not adjusting the pixel values in the adjacent segment.

V. Example Techniques for Multi-Threaded Deblock Filtering.

Figure 8:
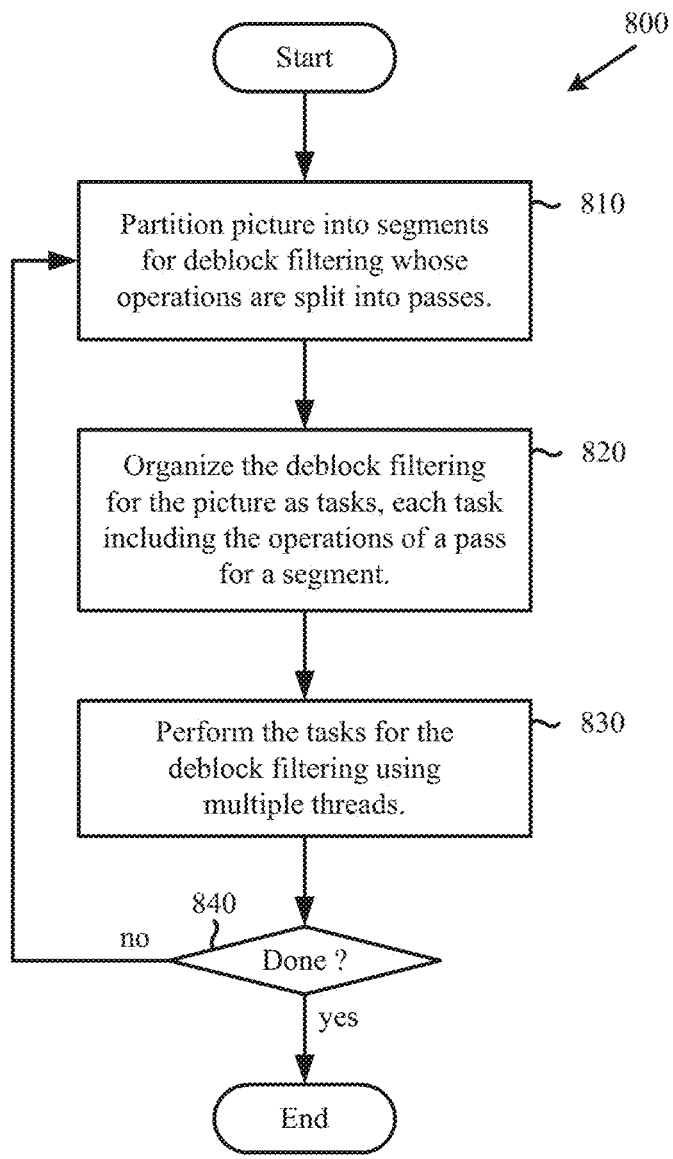
FIG. 8 is a flowchart showing a generalized technique for performing deblock filtering operations for multiple segments of a picture with multiple threads.

FIG. 8 shows a generalized technique (800) for performing deblock filtering with multiple threads. A computing system that implements a video encoder and/or video decoder, such as those described with reference to FIGS. 3 and 4) or other tool can perform the technique (800).

For a given picture, the tool (810) partitions the picture into multiple segments for deblock filtering whose operations are split into multiple passes (e.g., 2, 3, 4 or more passes). For example, segment boundaries for the segments align with block boundaries of the picture, and each of the multiple segments includes one or more rows (for horizontal segments) or columns (for vertical segments) of the blocks of the picture. Alternatively, the segments are organized in some other way and/or align in a different way with lines of the picture.

The number (count n) of segments can be set based on the number (count) of threads to be used for the deblock filtering. For example, if four threads will be used for deblock filtering, the picture is partitioned into four segments. Alternatively, the number of segments is determined according to other and/or additional criteria.

The multiple passes can include a pass for making filtering decisions for the segments and one or more boundary filtering passes. The tool can select between different patterns for splitting the operations of in-loop deblock filtering into multiple passes. For example, the tool determines picture coding type and/or FCM of the picture, then selects between multiple different patterns of passes based at least in part on the picture coding type and/or frame coding type. Sections IV.C-IV.E describe examples of patterns for splitting in-loop deblock filtering operations into multiple passes depending on picture coding type and FCM. Alternatively, the tool uses other and/or additional patterns for the multiple passes, possibly switching patterns based on criteria other than and/or in addition to picture coding type and FCM.

The tool organizes (820) the deblock filtering for the picture as multiple tasks. A given task includes the operations of a given pass for a given segment. In general, the tool determines task dependencies between tasks based on which lines of the picture are in the respective segments, and based on which operations of the deblock filtering are in the respective passes. Examples of task dependencies are explained in Sections IV.C-IV.F. For a given segment, the performance of operations for a given pass is typically dependent on completion of operations for at least one previous pass for that segment. For the given segment, the performance of operations for the given pass may also be subject to a cross-pass, cross-segment dependency (between the given pass of the given segment and an adjacent pass of an adjacent segment). For example, a cross-pass, cross-segment dependency can be due to use, during the given pass of the given segment, of a loop filter flag set in the adjacent pass of the adjacent segment. Or, the cross-pass, cross-segment dependency can be due to use, during the given pass of the given segment, of pixel values set in the adjacent pass of the adjacent segment.

The tool performs (830) the tasks for deblock filtering using multiple threads. In general, the performance of the tasks is constrained by the task dependencies. The deblock filtering can be performed as part of in-loop deblock filtering, performed as part of post-processing deblock filtering, or separately performed as part of both.

The tool then checks (840) whether to continue with the next picture or finish. For the sake of presentation, FIG. 8 shows repetition of the technique (800) on a picture-by-picture basis. Alternatively, the technique is repeated on some other basis (e.g., slice-by-slice basis). For the sake of simplicity, FIG. 8 does not show the ways that the multi-threaded deblock filtering can be integrated with other aspects of video coding and decoding.

VI. Results.

The approaches described herein facilitate encoding and decoding that is conformant to a standard or format. At the same time, deblock filtering operations are split into multiple passes in ways that allow multi-threading to scale to 4, 6 or even more threads running in parallel on different processing units. In particular, the pixel values produced by in-loop deblock filtering are correct and unchanged compared to other approaches, but processing speed is improved.

Using a test implementation of in-loop deblock filtering with multi-threading for VC-1 decoding, performance is significantly improved for test video clips encoded as I pictures and P pictures. Tables 1-3 summarize improvements for in-loop deblock filtering of the video clips with FCM of progressive frame, interlaced field and interlaced frame, respectively, for three different computing systems, each system running four threads. The test used multiple passes as described in sections IV.C to IV.E. The performance improvements are expressed in terms of overall decoding speed (in frames per second for overall decoding, including in-loop deblock filtering) and improvement in multi-thread scaling factor (that is, the ratio between decoding speeds for multi-threaded decoding with n threads (here, n=4) versus single-threaded decoding). Before adding multi-threading for in-loop deblock filtering, various other parts of decoding such as the inverse frequency transform and motion compensation used multi-threading. The "old" multi-thread scaling factor indicates decoding speed improvement for such multi-threaded decoding (with single-threaded in-loop deblock filtering) compared to pure single-threaded decoding. The "new" multi-thread scaling factor indicates decoding speed improvement when the multi-threaded decoding also includes multi-threaded in-loop deblock filtering.

TABLE 1

Multi-threaded In-Loop Deblock Filtering for Progressive Mode.

| System | Old Speed (fps) | New Speed (fps) | Decoder Speed-up | MT Scaling Factor (old → new (gain)) |
|---|---|---|---|---|
| Intel Nehalem | 716.72 | 916.29 | 27.84% | 2.35x → 3.01x (+0.66x) |
| AMD Opteron | 119.39 | 137.07 | 14.80% | 3.12x → 3.58x (+0.46x) |
| Intel Boulder Creek | 398.82 | 434.86 | 9.03% | 1.93x → 2.11x (+0.18x) |

TABLE 2

Multi-threaded In-Loop Deblock Filtering
for Interlaced Field Mode.

| System | Old Speed (fps) | New Speed (fps) | Decoder Speed-up | MT Scaling Factor (old → new (gain)) |
|---|---|---|---|---|
| Intel Nehalem | 240.82 | 302.50 | 25.61% | 1.88x → 2.36x (+0.48x) |
| AMD Opteron | 47.67 | 58.34 | 22.38% | 2.74x → 3.35x (+0.61x) |
| Intel Boulder Creek | 157.35 | 178.90 | 13.69% | 1.73x → 1.97x (+0.23x) |

TABLE 3

Multi-threaded In-Loop Deblock Filtering
for Interlaced Frame Mode.

| System | Old Speed (fps) | New Speed (fps) | Decoder Speed-up | MT Scaling Factor (old → new (gain)) |
|---|---|---|---|---|
| Intel Nehalem | 158.31 | 233.47 | 47.47% | 1.64x → 2.42x (+0.78x) |
| AMD Opteron | 36.76 | 51.16 | 39.17% | 2.08x → 2.89x (+0.81x) |
| Intel Boulder Creek | 117.78 | 161.47 | 37.09% | 1.62x → 2.23x (+0.59x) |

For the clips evaluated, multi-threaded in-loop deblock filtering for VC-1 decoding improves decoding speed by up to 47%. Although the clips were tested on multi-core computing systems with four runnable threads, the implementation is scalable to higher numbers of processing cores and threads. Moreover, although the clips were evaluated during decoding, the implementation can be used in a straightforward way for corresponding in-loop deblock filtering during encoding, since the filtering rules and dependencies are the same, or for post-processing deblock filtering. Finally, although the test implementation is adapted for decoding according to the VC-1 standard, the approaches described herein can be applied to deblock filtering during encoding and decoding according to other standards or formats, by making appropriate changes to account for adaptive filtering rules and dependencies between segments and passes.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising:
   memory configured to store a video picture; and
   a video encoder and/or video decoder configured to:
   partition the video picture into multiple segments for deblock filtering whose operations are split into multiple passes for a given segment of the multiple segments, each of the multiple passes including different operations, among the operations of the deblock filtering, that are to be performed on a per pass basis across all blocks and/or sub-blocks of the given segment to complete that pass for the given segment;
   organize the deblock filtering for the video picture as multiple tasks, wherein a given task of the multiple tasks includes the operations of one of the multiple passes for one of the multiple segments; and
   perform the multiple tasks with multiple threads, wherein the performance of the multiple tasks is constrained by task dependencies that include a cross-pass, cross-segment dependency between a given pass for the given segment and an adjacent pass for an adjacent segment of the multiple segments, the given pass for the given segment being dependent on completion of the adjacent pass for the adjacent segment for all blocks and/or sub-blocks of the adjacent segment, and wherein the performance of the multiple tasks includes parallel execution of one of the multiple tasks for the given segment and one of the multiple tasks for the adjacent segment.

2. The computer system of claim 1, wherein the deblock filtering is in-loop deblock filtering or post-processing deblock filtering, wherein segment boundaries for the multiple segments align with block boundaries of blocks of the video picture, and wherein each of the multiple segments includes one or more rows or columns of the blocks of the video picture.

3. The computer system of claim 1, wherein the video encoder and/or video decoder is further configured to set a count for the multiple segments based at least in part on a count of the multiple threads that are to be used for the deblock filtering.

4. The computer system of claim 1, wherein the deblock filtering is in-loop deblock filtering, and wherein the multiple passes comprise:
   a first pass that includes making at least some filtering decisions per segment;
   a second pass that includes adaptive filtering of any horizontal block boundaries to be filtered;
   a third pass that includes adaptive filtering of any horizontal sub-block boundaries to be filtered; and
   a fourth pass that includes adaptive filtering of any vertical boundaries to be filtered.

5. The computer system of claim 4, wherein, according to the task dependencies:
   for the first pass, the multiple segments are independent of each other;
   for the second pass, the given segment is dependent on completion of the first pass for the given segment and dependent on completion of the first pass for the adjacent segment;
   for the third pass, the given segment is dependent on completion of the second pass for the given segment and dependent on completion of the second pass for another adjacent segment; and
   for the fourth pass, the multiple segments are independent of each other, but the given segment is dependent on completion of the third pass for the given segment.

6. The computer system of claim 1, wherein the video encoder and/or video decoder is further configured to determine the task dependencies based at least in part on which lines of the video picture are in the respective multiple segments and which operations of the deblock filtering are in the respective multiple passes.

7. The computer system of claim 1, wherein the cross-pass, cross-segment dependency is due to use, during the given pass of the given segment, of a loop filter flag set in the adjacent pass of the adjacent segment.

8. The computer system of claim 1, wherein the cross-pass, cross-segment dependency is due to use, during the given pass of the given segment, of pixel values set in the adjacent pass of the adjacent segment.

9. One or more computer-readable memory or storage devices storing computer-executable instructions for causing multiple processing units, when programmed thereby, to perform operations during video encoding and/or video decoding, the operations comprising:

partitioning a video picture into multiple segments for in-loop deblock filtering;

selecting between multiple different patterns for splitting operations of the in-loop deblock filtering into multiple passes for a given segment of the multiple segments, each of the multiple passes including different operations, among the operations of the in-loop deblock filtering, that are to be performed on a per pass basis across all blocks and/or sub-blocks of the given segment to complete that pass for the given segment;

organizing the in-loop deblock filtering for the video picture as multiple tasks, a given task of the multiple tasks including the operations of one of the multiple passes for one of the multiple segments; and performing the multiple tasks with multiple threads, wherein the performing the multiple tasks includes parallel execution of one of the multiple tasks for the given segment and one of the multiple tasks for an adjacent segment of the multiple segments, the given segment and the adjacent segment having a task dependency between a given pass for the given segment and an adjacent pass for the adjacent segment, the given pass for the given segment being dependent on completion of the adjacent pass for the adjacent segment for all blocks and/or sub-blocks of the adjacent segment.

10. The one or more computer-readable memory or storage devices of claim 9, wherein, for the given segment of the multiple segments, the multiple passes comprise:
a first pass that includes adaptive filtering of horizontal boundaries in the given segment; and
a second pass that includes adaptive filtering of vertical boundaries in the given segment.

11. The one or more computer-readable memory or storage devices of claim 9, wherein the multiple passes comprise:
a first pass that includes making at least some filtering decisions per segment;
a second pass that includes adaptive filtering of any horizontal block boundaries to be filtered;
a third pass that includes adaptive filtering of any horizontal sub-block boundaries to be filtered; and
a fourth pass that includes adaptive filtering of any vertical boundaries to be filtered.

12. The one or more computer-readable memory or storage devices of claim 11, wherein:
for the first pass, the multiple segments are independent of each other;
for the second pass, the given segment is dependent on completion of the first pass for the given segment and dependent on completion of the first pass for the adjacent segment;
for the third pass, the given segment is dependent on completion of the second pass for the given segment and dependent on completion of the second pass for another adjacent segment; and
for the fourth pass, the multiple segments are independent of each other, but the given segment is dependent on completion of the third pass for the given segment.

13. The one or more computer-readable memory or storage devices of claim 9, wherein segment boundaries for the multiple segments align with block boundaries of blocks of the video picture, and wherein each of the multiple segments includes one or more rows or columns of the blocks of the video picture.

14. The one or more computer-readable memory or storage devices of claim 9, wherein the operations further comprise setting a count for the multiple segments based at least in part on a count of the multiple threads that are to be used for the deblock filtering.

15. The one or more computer-readable memory or storage devices of claim 9, wherein the operations further comprise determining task dependencies based at least in part on which lines of the video picture are in the respective multiple segments and which operations of the deblock filtering are in the respective multiple passes.

16. A method comprising:
partitioning a video picture into multiple segments for deblock filtering whose operations are split into three or more passes for a given segment of the multiple segments, each of the three or more passes including different operations, among the operations of the deblock filtering, that are to be performed on a per pass basis across all blocks and/or sub-blocks of the given segment to complete that pass for the given segment;
organizing the deblock filtering for the video picture as multiple tasks, a given task of the multiple tasks including the operations of one of the passes for one of the multiple segments; and
performing the multiple tasks with multiple threads, wherein the performing the multiple tasks includes parallel execution of one of the multiple tasks for the given segment and one of the multiple tasks for an adjacent segment of the multiple segments, the given segment and the adjacent segment having a task dependency between a given pass for the given segment and an adjacent pass for the adjacent segment, the given pass for the given segment being dependent on completion of the adjacent pass for the adjacent segment for all blocks and/or sub-blocks of the adjacent segment.

17. The method of claim 16, wherein the three or more passes comprise a first pass for making filtering decisions for the multiple segments.

18. The method of claim 17, wherein the three or more passes further comprise:
a second pass for adaptive filtering of any horizontal block boundaries to be filtered;
a third pass for adaptive filtering of any horizontal sub-block boundaries to be filtered; and
a fourth pass for adaptive filtering of any vertical boundaries to be filtered.

19. The method of claim 16, wherein segment boundaries for the multiple segments align with block boundaries of blocks of the video picture, and wherein each of the multiple segments includes one or more rows or columns of the blocks of the video picture.

20. The method of claim 16, further comprising setting a count for the multiple segments based at least in part on a count of the multiple threads that are to be used for the deblock filtering.

* * * * *